US012472231B2

(12) United States Patent
Zhao et al.

(10) Patent No.: US 12,472,231 B2
(45) Date of Patent: *Nov. 18, 2025

(54) COMPOSITIONS OF ANTI-VIRAL PEPTIDES AND METHODS OF USE THEREOF

(71) Applicant: The University of Hong Kong, Hong Kong (CN)

(72) Inventors: Hanjun Zhao, Hong Kong (CN); Kevin K.W. To, Hong Kong (CN); Kwok-Yung Yuen, Hong Kong (CN)

(73) Assignee: The University Of Hong Kong, Hong Kong (CN)

( * ) Notice: Subject to any disclaimer, the term of this patent is extended or adjusted under 35 U.S.C. 154(b) by 569 days.

This patent is subject to a terminal disclaimer.

(21) Appl. No.: 17/930,626

(22) PCT Filed: Mar. 2, 2021

(86) PCT No.: PCT/CN2021/078639

§ 371 (c)(1),
(2) Date: Sep. 8, 2022

(87) PCT Pub. No.: WO2021/185071

PCT Pub. Date: Sep. 23, 2021

(65) Prior Publication Data

US 2023/0165936 A1 Jun. 1, 2023

Related U.S. Application Data

(60) Provisional application No. 62/991,407, filed on Mar. 18, 2020.

(51) Int. Cl.

| | |
|---|---|
| ***A61K 38/17*** | (2006.01) |
| ***A61P 31/14*** | (2006.01) |
| ***A61P 31/16*** | (2006.01) |
| ***C07K 14/47*** | (2006.01) |

(52) U.S. Cl.

CPC .......... *A61K 38/1729* (2013.01); *A61P 31/14* (2018.01); *A61P 31/16* (2018.01)

(58) Field of Classification Search

None

See application file for complete search history.

(56) References Cited

U.S. PATENT DOCUMENTS

| | | | |
|---|---|---|---|
| 2010/0029547 | A1 | 2/2010 | Bewley |
| 2013/0280204 | A1 | 10/2013 | Weight et al. |
| 2023/0158136 | A1 | 5/2023 | Zhao et al. |
| 2023/0398177 | A1 | 12/2023 | Zhao et al. |
| 2024/0148820 | A1 | 5/2024 | Zhao et al. |

FOREIGN PATENT DOCUMENTS

| | | | |
|---|---|---|---|
| EP | 1959013 | A1 | 8/2008 |
| KR | 20190070629 | A | 6/2019 |
| WO | 9851794 | A1 | 11/1998 |
| WO | 03041710 | A1 | 5/2003 |
| WO | 2009083249 | A2 | 7/2009 |
| WO | 2012021558 | A1 | 2/2012 |
| WO | 2013026794 | A1 | 2/2013 |
| WO | 2014180180 | | 11/2014 |
| WO | 2018108971 | A2 | 6/2018 |
| WO | 2019206285 | A1 | 10/2019 |
| WO | 2020047333 | A1 | 3/2020 |
| WO | 2020231855 | A1 | 11/2020 |
| WO | 2021015437 | A1 | 1/2021 |

OTHER PUBLICATIONS

Al-Azzam, et al., "Peptides to combat viral infectious diseases", Peptides, 134: 170402 (2020).

Brice, et al. "Antiviral Activities of Human Host Defense Peptides", Curr. Med. Chem., 27: 1420-1443 (2020).

Chan, et al., "A familial cluster of pneumonia associated with the 2019 novel coronavirus indicating person-to-person transmission: a study of a family cluster", Lancet., 395: 514-523 (2020).

Chan, et al., "Middle East respiratory syndrome coronavirus: another zoonotic betacoronavirus causing SARS-like disease", Clinical microbiology reviews, 28: 465-522 (2015).

Chandrababu, et al., "Structure, dynamics, and activity of an all-cysteine mutated human beta defensin-3 peptide analogue", Biochemistry 48: 6052-6061 (2009).

Cheng, V.C. et al., "Two years after pandemic influenza A/2009/H1N1: what have we learned?", Clinical microbiology reviews, 25: 223-263 (2012).

Cheung, et al., "DANGLE: A Bayesian inferential method for predicting protein backbone dihedral angles and secondary structure", J. Magn. Reson., 202: 223-233 (2010).

Falzarano, et al., "Lack of protection against ebola virus from chloroquine in mice and hamsters", Emerg. Infect. Dis., 21: 1065-1067 (2015).

Gomes, et al., "Designing improved active peptides for therapeutic approaches against infectious diseases", Biotechnol. Adv., 36: 415-429 (2018).

Hammen, et al., "The role of positive charges and structural segments in the presequence of rat liver aldehyde dehydrogenase in import into mitochondria", J. Biol. Chem., 271: 21041-21048 (1996).

(Continued)

*Primary Examiner* — Manjunath N Rao
*Assistant Examiner* — Jae W Lee
(74) *Attorney, Agent, or Firm* — Pabst Patent Group LLP

(57) ABSTRACT

Broad spectrum antiviral peptides and composition including therapeutically effective amounts of the antiviral peptides along with a pharmaceutically acceptable carrier are provided. The antiviral compositions show a strong broad spectrum antiviral effect, without resulting to viral resistance. The antiviral compositions are useful for treatment of diseases caused by viral infections, particularly respiratory viruses such as enveloped coronaviruses (SARS-CoV-2, SARS-CoV and MERS-CoV), the pandemic A(H1N1) pdm09 virus, avian influenza A(H7N9) virus, and the non-enveloped rhinovirus.

17 Claims, 6 Drawing Sheets

Specification includes a Sequence Listing.

(56) References Cited

OTHER PUBLICATIONS

Hayden, et al., "Baloxavir Marboxil for Uncomplicated Influenza in Adults and Adolescents", N. Engl. J. Med., 379: 913-923 (2018).
Helenius, et al., "Endosome maturation", EMBO J., 30: 3481-3500 (2011).
Jurgeit, et al., "Niclosamide is a proton carrier and targets acidic endosomes with broad antiviral effects", PLoS Pathog., 8: e1002976 (2012).
Kao, et al., "The antiparasitic drug niclosamide inhibits dengue virus infection by interfering with endosomal acidification independent of mTOR", PLoS Negl. Trop. Dis., 12: e0006715 (2018).
Klotman, et al. "Defensins in innate antiviral immunity", Nat. Rev. Immunol., 6: 447-456 (2006).
Laskowski,. et al., "AQUA and PROCHECK-NMR: programs for checking the quality of protein structures solved by NMR", J. Biomol. NMR, 8: 477-486 (1996).
Lau, et al., "Severe acute respiratory syndrome coronavirus-like virus in Chinese horseshoe bats", Proc. Natl. Acad. Sci. USA, 102: 14040-14045 (2005).
Leikina, et al., "Carbohydrate-binding molecules inhibit viral fusion and entry by crosslinking membrane glycoproteins", Nat. Immunol., 6:995-1001 (2005).
Li, et al., "A scorpion venom peptide Ev37 restricts viral late entry by alkalizing acidic organelles", J. Biol. Chem., 294: 182-194 (2019).
Li, et al., "Chloroquine, a FDA-approved Drug, Prevents Zika Virus Infection and its Associated Congenital Microcephaly in Mice", EBioMedicine, 24: 189-194 (2017).
Li, et al., "Early Transmission Dynamics in Wuhan, China, of Novel Coronavirus-Infected Pneumonia", N. Engl. J. Med., 6: 995-1001 (2020).
Li, et al., "Virucidal activity of a scorpion venom peptide variant mucroporin-M1 against measles, SARS-CoV and influenza H5N1 viruses", Peptides, 32: 1518-1525 (2011).
Liu, et al., "Different from the HIV fusion inhibitor C34, the anti-HIV drug Fuzeon (T-20) inhibits HIV-1 entry by targeting multiple sites in gp41 and gp120", J. Biol. Chem., 280: 11259-11273 (2005).
Liu, et al., "Linear analogues of human beta-defensin 3: concepts for design of antimicrobial peptides with reduced cytotoxicity to mammalian cells", Chembiochem., 9: 964-973 (2008).
Lu, et al., "Structure-based discovery of Middle East respiratory syndrome coronavirus fusion inhibitor", Nat. Commun.. 5: 3067 (2014).
Michen, et al., "Isoelectric points of viruses", J. Appl. Microbiol. 109: 388-397 (2010).
Moscona, "Entry of parainfluenza virus into cells as a target for interrupting childhood respiratory disease", J. Clin. Invest., 115: 1688-1698 (2005).
Nakano, et al., "Structural and computational analysis of peptide recognition mechanism of class-C type penicillin binding protein, alkaline D-peptidase from Bacillus cereus DF4-B", Sci. Rep., 5: 13836 (2015).
Paton, et al., "Chloroquine for influenza prevention: a randomised, double-blind, placebo controlled trial", Lancet. Infect. Dis., 11: 677-683 (2011).
Pettersen, et al., "UCSF Chimera—a visualization system for exploratory research and analysis", J. Comput. Chem., 25: 1605-1612 (2004).
Rajendran, et al. Subcellular targeting strategies for drug design and delivery. Nat Rev Drug Discov 9, 29-42 (2010).
Rieping, et al., "ARIA2: automated NOE assignment and data integration in NMR structure calculation", Bioinformatics, 23: 381-382 (2007).
Sample, et al., "A mastoparan-derived peptide has broad-spectrum antiviral activity against enveloped viruses", Peptides, 48: 96-105 (2013).
Seppala, et al., "Flexible Structure of Peptide-Bound Filamin A Mechanosensor Domain Pair 20-21", PLoS One, 10: e0136969 (2015).
Skinner, S.P. et al., "CcpNmr AnalysisAssign: a flexible platform for integrated NMR analysis", J. Biomol. NMR, 66: 111-124 (2016).
Smith, et al. "Mechanism of adenovirus neutralization by Human alpha-defensins", Cell Host Microbe, 3: 11-19 (2008).
Swanson, et al. "Engineering a therapeutic lectin by uncoupling mitogenicity from antiviral activity", Cell, 163: 746-758 (2015).
Tan, et al., "An evaluation of Chloroquine as a broad-acting antiviral against Hand, Foot and Mouth Disease", Antiviral Res, 149: 143-149 (2018).
To, et al., "Pulmonary and extrapulmonary complications of human rhinovirus infection in critically ill patients", J. Clin. Virol., 77: 85-91 (2016).
To, et al., "The emergence of influenza A H7N9 in human beings 16 years after influenza A H5N1: a tale of two cities", Lancet Infect Dis, 13: 809-821 (2013).
Vigant, et al., "Broad-spectrum antivirals against viral fusion", Nat. Rev. Microbiol., 13: 426-437 (2015).
Wang, et al., "Remdesivir and chloroquine effectively inhibit the recently emerged novel coronavirus (2019-nCOV) in vitro", Cell Res., 30: 269-271 (2020).
Woo, et al., "Relative rates of non-pneumonic SARS coronavirus infection and SARS coronavirus pneumonia", Lancet, 363: 841-845 (2004).
Yan, et al., "Intrinsic antiviral immunity", Nat. Immunol., 13: 214-222 (2012).
Yeung, M.L. et al., "MERS coronavirus induces apoptosis in kidney and lung by upregulating Smad7 and FGF2", Nat. Microbiol., 1: 16004 (2016).
Yu, et al., "A peptide-based viral inactivator inhibits Zika virus infection in pregnant mice and fetuses", Nat Commun, 8: 15672 (2017).
Yuan, et al. "SREBP-dependent lipidomic reprogramming as a broad-spectrum antiviral target", Nat. Commun., 10: 120 (2019).
Zhao, et al., "A novel peptide with potent and broad-spectrum antiviral activities against multiple respiratory viruses", Sci. Rep., 6: 22008 (2016).
Zhao, et al., "Dual-functional peptide with defective interfering genes effectively protects mice against avian and seasonal influenza", Nat. Commun. 9: 2358 (2018).
Zhao, et al.,. "A broad-spectrum virus- and host-targeting peptide against respiratory viruses including influenza virus and SARS-CoV-2", Nat Commun, 11: 4252 (2020).
Zheng, et al., "Delayed antiviral plus immunomodulator treatment still reduces mortality in mice infected by high inoculum of influenza A/H5N1 virus", Proc. Natl. Acad. Sci. U S A, 105: 8091-8096 (2008).
International Search Report received for PCT Patent Application No. PCT/CN2022/141996, mailed on Mar. 24, 2023, 6 pages.
Al-Bayatee , et al., "Human beta-defensins 2 and 4 are dysregulated in patients with coronavirus disease 19", Microb Pathog., vol. 160, No. 105205, Nov. 2021, 7 pages.
Bauer , et al., "Structure determination of human and murine β-defensins reveals structural conservation in the absence of significant sequence similarity", Protein Sci., vol. 10, No. 12, Dec. 2001, pp. 2470-2479.
International Search Report received for PCT Patent Application No. PCT/CN2021/125649, mailed on Jan. 19, 2022, 7 pages.
International Search Report received for PCT Patent Application No. PCT/CN2022/076453, mailed on May 16, 2022, 6 pages.
International Search Report received for PCT Patent Application No. PCT/CN2021/078639, mailed on May 26, 2021, 7 pages.
GENBANK , "Chain A, Peptide P9R", Genbank Accession No. 6M56_A, Dec. 1, 2020, 1 page.
Huang , et al., "Preliminary evidence from a multicenter prospective observational study of the safety and efficacy of chloroquine for the treatment of COVID-19", Natl Sci Rev., vol. 7, No. 9, May 28, 2020, pp. 1428-1436.
Maisonnasse , et al., "Hydroxychloroquine use against SARS-CoV-2 infection in non-human primates", Nature, vol. 585, No. 7826, Sep. 24, 2020, pp. 584-587.
Mckee , et al., "Candidate drugs against SARS-CoV-2 and COVID-19", Pharmacol Res., vol. 157, No. 104859, Jul. 2020, 9 pages.

(56) References Cited

OTHER PUBLICATIONS

Wang , et al., "The anti-influenza virus drug, arbidol is an efficient inhibitor of SARS-CoV-2 in vitro", Cell Discov., vol. 6, No. 28, May 2, 2020, 5 pages.
Zhao , et al., "Cross-linking peptide and repurposed drugs inhibit both entry pathways of SARS-CoV-2", Nat Commun., vol. 12, No. 1: 1517, Mar. 9, 2021, 9 pages.

| Peptide | Sequence | Positive charge |
| --- | --- | --- |
| P9 | NGAICWGPCPTAFRQIGNCGHFKVRCCKIR | +4.7 |
| P9R | NGAICWGPCPTAFRQIGNCGRFRVRCCRIR | +5.6 |
| PA1 | NGAICWGPCPTAFRQIGNCGHFKVRCCKIRDED | +1.7 |
| P9RS | NGAHSWHPNETHFRQIHNSGRHRVRSHRIR | +5.6 |
FIG. 1A
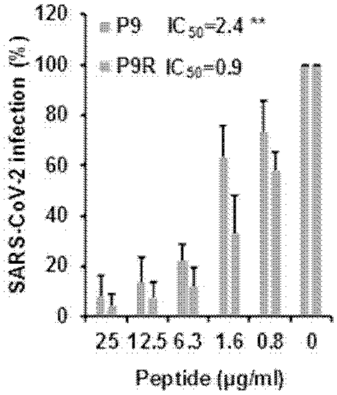
FIG. 1B
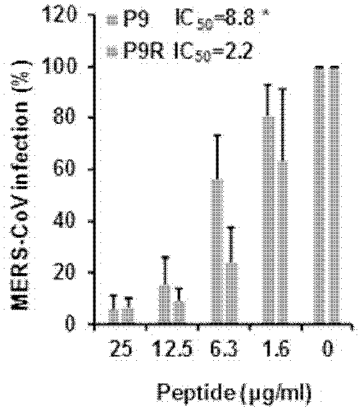
FIG. 1C
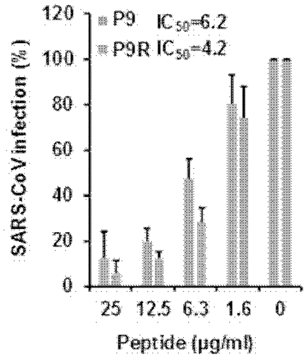
FIG. 1D
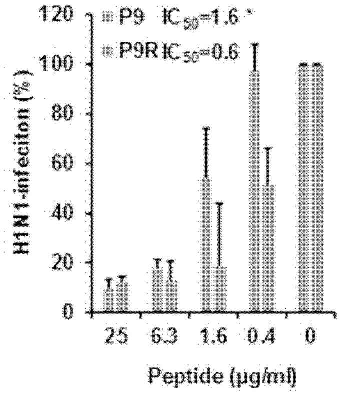
FIG. 1E

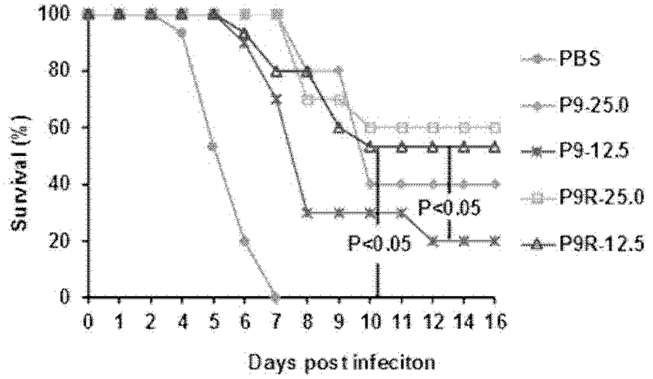
FIG. 4C
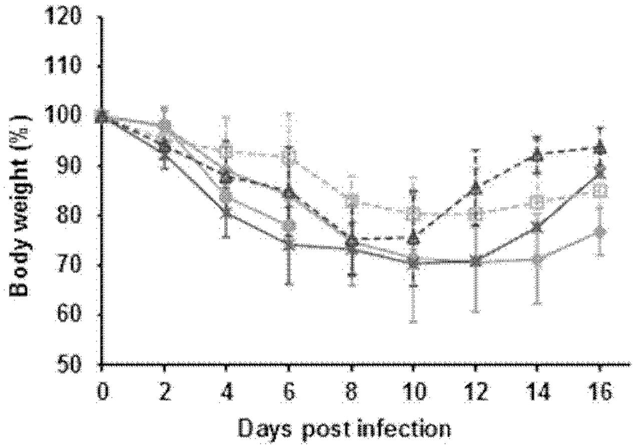
FIG. 4D
| Virus strain | Passage No. | Zanamivir | P9R |
|---|---|---|---|
| | 1-5 | 100 nM | 5 μg ml$^{-1}$ |
| A(H1N1) | 6-10 | 100 nM | 5 μg ml$^{-1}$ |
| | 11-15 | 1,000 nM | 50 μg ml$^{-1}$ |
| | 16-40 | ND | 50 μg ml$^{-1}$ |
FIG. 5A

SEQUENCE LISTING

```
<160> NUMBER OF SEQ ID NOS: 17

<210> SEQ ID NO 1
<211> LENGTH: 30
<212> TYPE: PRT
<213> ORGANISM: Artificial Sequence
<220> FEATURE:
<223> OTHER INFORMATION: P9 peptide

<400> SEQUENCE: 1

Asn Gly Ala Ile Cys Trp Gly Pro Cys Pro Thr Ala Phe Arg Gln Ile
1               5                   10                  15
```

```
Gly Asn Cys Gly His Phe Lys Val Arg Cys Cys Lys Ile Arg
            20                  25                  30


<210> SEQ ID NO 2
<211> LENGTH: 30
<212> TYPE: PRT
<213> ORGANISM: Artificial Sequence
<220> FEATURE:
<223> OTHER INFORMATION: P9R peptide

<400> SEQUENCE: 2

Asn Gly Ala Ile Cys Trp Gly Pro Cys Pro Thr Ala Phe Arg Gln Ile
1               5                   10                  15

Gly Asn Cys Gly Arg Phe Arg Val Arg Cys Cys Arg Ile Arg
            20                  25                  30


<210> SEQ ID NO 3
<211> LENGTH: 33
<212> TYPE: PRT
<213> ORGANISM: Artificial Sequence
<220> FEATURE:
<223> OTHER INFORMATION: PA1 peptide

<400> SEQUENCE: 3

Asn Gly Ala Ile Cys Trp Gly Pro Cys Pro Thr Ala Phe Arg Gln Ile
1               5                   10                  15

Gly Asn Cys Gly His Phe Lys Val Arg Cys Cys Lys Ile Arg Asp Glu
            20                  25                  30

Asp


<210> SEQ ID NO 4
<211> LENGTH: 30
<212> TYPE: PRT
<213> ORGANISM: Artificial Sequence
<220> FEATURE:
<223> OTHER INFORMATION: P9RS peptide

<400> SEQUENCE: 4

Asn Gly Ala His Ser Trp His Pro Asn Glu Thr His Phe Arg Gln Ile
1               5                   10                  15

His Asn Ser Gly Arg His Arg Val Arg Ser His Arg Ile Arg
            20                  25                  30


<210> SEQ ID NO 5
<211> LENGTH: 30
<212> TYPE: DNA
<213> ORGANISM: Artificial Sequence
<220> FEATURE:
<223> OTHER INFORMATION: Primer sequence for SARS-CoV-2

<400> SEQUENCE: 5

cctactaaat taaatgatct ctgctttact                                      30


<210> SEQ ID NO 6
<211> LENGTH: 21
<212> TYPE: DNA
<213> ORGANISM: Artificial Sequence
<220> FEATURE:
<223> OTHER INFORMATION: Primer sequence for SARS-CoV-2

<400> SEQUENCE: 6

caagctataa cgcagcctgt a                                               21
```

<210> SEQ ID NO 7
<211> LENGTH: 25
<212> TYPE: DNA
<213> ORGANISM: Artificial Sequence
<220> FEATURE:
<223> OTHER INFORMATION: Primer sequence for MERS-CoV

<400> SEQUENCE: 7
caaaaccttc cctaagaagg aaaag 25

<210> SEQ ID NO 8
<211> LENGTH: 22
<212> TYPE: DNA
<213> ORGANISM: Artificial Sequence
<220> FEATURE:
<223> OTHER INFORMATION: Primer sequence for MERS-CoV

<400> SEQUENCE: 8
gctcctttgg aggttcagac at 22

<210> SEQ ID NO 9
<211> LENGTH: 20
<212> TYPE: DNA
<213> ORGANISM: Artificial Sequence
<220> FEATURE:
<223> OTHER INFORMATION: Primer sequence for SARS-CoV

<400> SEQUENCE: 9
accagaatgg aggacgcaat 20

<210> SEQ ID NO 10
<211> LENGTH: 25
<212> TYPE: DNA
<213> ORGANISM: Artificial Sequence
<220> FEATURE:
<223> OTHER INFORMATION: Primer sequence for SARS-CoV

<400> SEQUENCE: 10
gctgtgaacc aagacgcagt attat 25

<210> SEQ ID NO 11
<211> LENGTH: 21
<212> TYPE: DNA
<213> ORGANISM: Artificial Sequence
<220> FEATURE:
<223> OTHER INFORMATION: Primer sequence for H1N1

<400> SEQUENCE: 11
cttctaaccg aggtcgaaac g 21

<210> SEQ ID NO 12
<211> LENGTH: 22
<212> TYPE: DNA
<213> ORGANISM: Artificial Sequence
<220> FEATURE:
<223> OTHER INFORMATION: Primer sequence for H1N1

<400> SEQUENCE: 12
ggcattttgg acaaakcgtc ta 22

<210> SEQ ID NO 13
<211> LENGTH: 21
<212> TYPE: DNA
<213> ORGANISM: Artificial Sequence
<220> FEATURE:
<223> OTHER INFORMATION: Primer sequence for H7N9

-continued

```
<400> SEQUENCE: 13

cttctaaccg aggtcgaaac g                                              21


<210> SEQ ID NO 14
<211> LENGTH: 22
<212> TYPE: DNA
<213> ORGANISM: Artificial Sequence
<220> FEATURE:
<223> OTHER INFORMATION: Primer sequence for H7N9

<400> SEQUENCE: 14

ggcattttgg acaaakcgtc ta                                             22


<210> SEQ ID NO 15
<211> LENGTH: 16
<212> TYPE: DNA
<213> ORGANISM: Artificial Sequence
<220> FEATURE:
<223> OTHER INFORMATION: Primer sequence for Rhinovirus

<400> SEQUENCE: 15

agccygcgtg gckgcc                                                    16


<210> SEQ ID NO 16
<211> LENGTH: 16
<212> TYPE: DNA
<213> ORGANISM: Artificial Sequence
<220> FEATURE:
<223> OTHER INFORMATION: Primer sequence for Rhinovirus

<400> SEQUENCE: 16

agccygcgtg gtgccc                                                    16


<210> SEQ ID NO 17
<211> LENGTH: 22
<212> TYPE: DNA
<213> ORGANISM: Artificial Sequence
<220> FEATURE:
<223> OTHER INFORMATION: Probe sequence for Rhinovirus

<400> SEQUENCE: 17

tccggcccct gaatgyggct aa                                             22
```

COMPOSITIONS OF ANTI-VIRAL PEPTIDES AND METHODS OF USE THEREOF

CROSS-REFERENCE TO RELATED APPLICATIONS

This application is a National Phase application under 35 U.S.C. 371 of international patent application PCT/CN2021/078639, filed Mar. 2, 2021, which claims priority to and the benefit of U.S. Provisional Patent Application No. 62/991,407 filed on Mar. 18, 2020, the entire contents of which are incorporated by reference for all purposes.

FIELD OF THE INVENTION

The invention is generally directed to broad spectrum antiviral peptides and methods of treating antiviral infections.

BACKGROUND OF THE INVENTION

Novel respiratory viruses often cause severe respiratory tract infections and spread quickly due to the lack of pre-existing immunity. In the recent two decades, three highly pathogenic coronaviruses have crossed species barrier and caused human diseases, including the bat-related severe acute respiratory syndrome (SARS) coronavirus (CoV) (SARS-CoV) in 2003[1, 2], the Middle East respiratory syndrome coronavirus (MERS-CoV) since 2012[3,4] and the recent 2019 new coronavirus (SARS-CoV-2)[5]. Furthermore, the 2009 pandemic influenza A(H1N1)pdm09 virus had led to the 1$^{st}$ influenza pandemic in the 21$^{st}$ century, and the avian influenza virus A(H7N9) had caused a large zoonotic outbreak in mainland China[6,7]. Due to the lack of effective antivirals, especially for coronaviruses, these respiratory viruses are associated with significant morbidity and mortality. Furthermore, these emerging respiratory viruses have also caused severe economic and social disturbances.

The COVID-2019 outbreak has clearly illustrated the importance of broad-spectrum antivirals. While an outbreak of unusual pneumonia was reported in December 2019, the identity of SARS-CoV-2 was reported on Jan. 8, 2020 by China CDC[8]. Currently, there is no specific drug treatment for this new virus. An effective broad-spectrum antiviral will improve patients' outcome and may reduce transmission in the community and hospitals even before the identification of the novel emerging virus and the specific antiviral drug. The 'one bug-one drug' approach to antiviral drug is successful for HIV, hepatitis C virus and influenza virus[9]. However, there is an urgent need for broad-spectrum antivirals for combating emerging and re-emerging new virus outbreaks, such as the SARS-CoV-2, before the new virus is identified or specific antiviral drug is available.

SUMMARY OF THE INVENTION

It is an object of the present invention to provide broad spectrum antiviral agents.

It is also an object of the present invention to provide compositions of broad spectrum antiviral agents.

It is still an object of the present invention to provide methods for treating viral infections in a subject in need thereof.

Antiviral agents, compositions containing the antiviral agents and methods of use thereof, are provided. The antiviral agents include P9R (SEQ ID NO:2), or P9R-like peptides derived from P9R, characterized in that they "inhibit endosomal acidification" and "peptide-virus binding" as determined by in vitro endosomal acidification and peptide-virus binding assays. In a preferred embodiment, the antiviral agent is P9R. The antiviral compositions include a therapeutically effective amount of the antiviral agents The antiviral compositions can be administered to a subject in need thereof, to treat the symptoms associated with a viral infection. Preferably the subject is infected with a respiratory virus, more preferably, a pH-dependent virus that requires endosomal acidification for virus-host membrane fusion. Examples include, but are not limited to the enveloped coronaviruses (SARS-CoV-2, SARS-CoV and MERS-CoV), the pandemic A(H1N1)pdm09 virus, avian influenza A(H7N9) virus, and the non-enveloped rhinovirus.

BRIEF DESCRIPTION OF THE DRAWINGS

FIG. 1A shows the peptide sequences (P9 (SEQ ID NO:1); P9R (SEQ ID NO:2); PA1 (SEQID NO; 3); and P9RS (SEQ ID NO:4)) and positive charge analyzed by PepCalc of InnovaGen. FIGS. 1B-1H showP9R inhibition viral replication of 2019 new coronavirus (SARS-CoV-2), MERS-CoV, SARS-CoV, H1N1 virus, H7N9 virus, rhinovirus, and parainfluenza 3 virus in cells. Viruses were premixed with different concentrations of P9R or P9 and then infected cells. The antiviral efficiency was evaluated by plaque reduction assay. Infection (%) was calculated by the plaque number of virus treated with peptides being divided by the plaque number of virus treated by BSA.

FIG. 3**E shows Peptides binding to virus and viral proteins. For peptides binding to SARS-CoV (left panel). SARS-CoV was incubated with the indicated peptides on ELISA plate for 1 h. The unbinding virus was washed away and the binding SRAR-CoV was quantified by RT-qPCR. Relative RNA copy (%) was normalized to RNA copy of virus binding to P9R. Peptides binding to H1N1 HA1 protein (middle panel). Peptides binding to MERS-CoV S protein (left panel). Peptides were coated on ELISA plates. The H1N1 HA and MERS-CoV S proteins binding to peptides were measured by ELISA assay. * indicates $P<0.05$. ** indicates $P<0.01$ when compared with P9R. P values were calculated by the two-tailed Student's t test.

FIG. 4C shows the effect of low doses of P9R on mice infected by A(H1N1)pdm09 virus compared to P9. PBS (n=10), P9-25 (25.0 μg/dose, n=5), P9-12.5 (12.5 μg/dose, n=5), P9R-25 (25.0 μg/dose, n=10), and P9R-12.5 (12.5 μg/dose, n=10) were intranasally inoculated to mice at 6 h post infection and two more doses were administrated to mice in the following one day. FIG. 4D shows the body weight change of infected mice corresponding to (FIG. 4C). P values were calculated by Gehan-Breslow-Wilcoxon test.

FIG. 5A shows the procedure of drug-resistance assay for zanamivir and P9R. A(H1N1) virus was passaged in the presence of indicated concentrations of zanamivir and P9R. ND, not detected because the high resistant H1N1 virus against zanamivir was generated before P16.

DETAILED DESCRIPTION OF THE INVENTION

I. Definitions

Figure 1F:
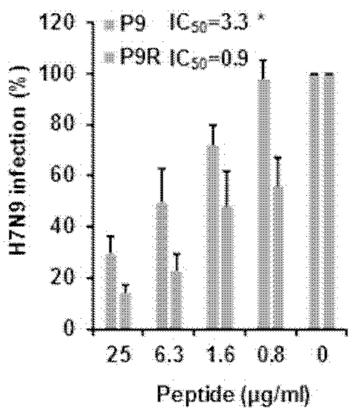
Figure 1G:
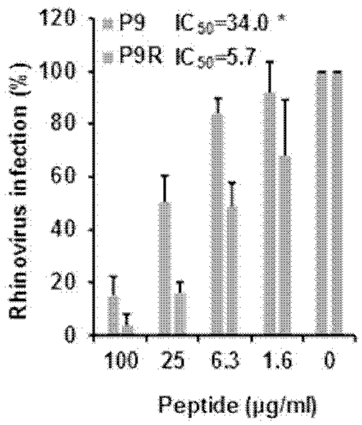

"Aerosol" as used herein refers to any preparation of a fine mist of particles, which can be in solution or a suspension, whether or not it is produced using a propellant.

An "emulsion" is a composition containing a mixture of non-miscible components homogenously blended together.

"Hydrophilic" as used herein refers to substances that have strongly polar groups that readily interact with water.

"Hydrophobic" as used herein refers to substances that lack an affinity for water; tending to repel and not absorb water as well as not dissolve in or mix with water.

"Lipophilic" as used herein refers to compounds having an affinity for lipids.

"Parenteral administration", as used herein, means administration by any method other than through the digestive tract or non-invasive topical or regional routes.

"Patient" or "subject" to be treated as used herein refers to either a human or non-human animal.

"Pharmaceutically acceptable" as used herein refers to those compounds, materials, compositions, and/or dosage forms which are, within the scope of sound medical judgment, suitable for use in contact with the tissues of human beings and animals without excessive toxicity, irritation, allergic response, or other problems or complications commensurate with a reasonable benefit/risk ratio.

"Pharmaceutically acceptable salt", as used herein, refers to derivatives of the compounds defined herein, wherein the parent compound is modified by making acid or base salts thereof.

"Therapeutically effective" or "effective amount" as used herein means that the amount of the composition used is of sufficient quantity to ameliorate one or more causes or symptoms of a disease or disorder. Such amelioration only requires a reduction or alteration, not necessarily elimination. As used herein, the terms "therapeutically effective amount" "therapeutic amount" and "pharmaceutically effective amount" are synonymous. One of skill in the art can readily determine the proper therapeutic amount.

A "subject" or "patient" refers to a human, primate, non-human primate, laboratory animal, farm animal, livestock, or a domestic pet.

II. Compositions

The disclosed compositions include a potent antiviral peptide P9R (NGAICWGPCPTAFRQIGNCGRFRVRCCRIR; SEQ ID NO:2), derived from mouse β-defensin-4 and P9 (NGAICWGPCPTAFRQIGNCGKFKVRCCKIR; (SEQ ID NO:1). Mechanistic studies showed that positively charged P9R broadly inhibits viral replication by binding to different viruses and then inhibiting virus-host endosomal acidification to prevent the endosomal release of pH-dependent viruses. We used P9R (not only binding to viruses but also inhibiting endosomal acidification), PA1 (only binding to viruses) and P9RS (only inhibiting endosomal acidification) to identify and confirm the novel antiviral mechanism of alkaline peptides. The antiviral activity of alkaline peptide could be enhanced by increasing the positive charge of peptide and required both of binding to viruses and inhibiting endosomal acidification.

A. Antiviral Peptides

The disclosed antiviral peptide preferably consists of the sequence of P9R. However, the antiviral peptide can include peptides derived from P9R, so long as the amino acids at positions 21, 23 and 28 are positively charge amino acids. Thus, the peptide can have the same amino acid sequence as P9R, with the arginine at positions 21, 23 and 28 replaced with a positively charged amino acid such as lysine or histidine. It is essential however that any modification of the P9R structure ensures that resulting peptide retains inhibition of endosomal acidification and retains virus binding to the same extent as P9R. Therefore, useful P9R-derived peptides (herein, P9R-like peptides) possess the properties of "inhibition of endosomal acidification" and "virus binding". It is within the abilities of one of ordinary skill in the art to vary the amino acids in P9R and test for the required activities (inhibition of endosomal acidification" and "virus binding") as shown in the examples of this application.

"A virus-binding assay" includes the following steps: Dissolving the Peptides (0.1 μg per well) in $H_2O$ and coating onto ELISA plates, then incubating at 4° C. overnight. Then, 2% BSA is added to block plates at 4° C. overnight. For virus binding to peptides, viruses are diluted in phosphate buffer and then added to ELISA plate for binding to the coated peptides at room temperature for 1 h. After washing the unbinding viruses, the binding viruses are lysed by RLT buffer of RNeasy Mini Kit (Qiagen, Cat #74106) for viral RNA extraction. Viral RNA copies of binding viruses were measured by RT-qPCR.

"An Endosomal acidification assay" can include detecting endosomal acidification with a pH-sensitive dye (pHrodo Red dextran, Invitrogen, Cat #P10361) according to the manufacturer's instructions as previously described but with slight modification[14]. First, MDCK cells are treated with BSA (25.0 μg $ml^{-1}$), P9 (25.0 μg $ml^{-1}$), P9R (25.0 μg $ml^{-1}$), PA1 (25.0 μg $ml^{-1}$), or P9RS (25.0 $\mu gml^{-1}$) at 4° C. for 15 min. Second, MDCK cells are added with 100 μg $ml^{-1}$ of pH-sensitive dye and DAPI and then incubated at 4° C. for 15 min. Before taking images, cells are further incubated at 37° C. for 15 min and then cells were washed twice with PBS. Finally, PBS is added to cells and images were taken immediately with confocal microscope (for example, Carl Zeiss LSM 700, Germany).

Therefore, the P9R-derived peptide should have an overall net positive charge of at least 5, preferably at least 5.6, and preferably, does not include amino acid modifications as shown for P9RS (SEQ ID NO:4). Preferably, also, the P9R-derived peptide does not include an introduction of additional amino acid residues at the C-terminal arginine.

Amino acid substitutions in P9R to obtain P9R-like peptides preferably include conservative amino acid substitutions.

Examples of conservative amino acid substitutions include those in which the substitution is within one of the five following groups: 1) small aliphatic, nonpolar or slightly polar residues (Ala, Ser, Thr, Pro, Gly); 2) polar, negatively charged residues and their amides (Asp, Asn, Glu, Gln); polar, positively charged residues (His, Arg, Lys); large aliphatic, nonpolar residues (Met, Leu, Ile, Val, Cys); and large aromatic resides (Phe, Tyr, Trp). Examples of non-conservative amino acid substitutions are those where 1) a hydrophilic residue, e.g., seryl or threonyl, is substituted for (or by) a hydrophobic residue, e.g., leucyl, isoleucyl, phenylalanyl, valyl, or alanyl; 2) a cysteine or proline is substituted for (or by) any other residue; 3) a residue having an electropositive side chain, e.g., lysyl, arginyl, or histidyl, is substituted for (or by) an electronegative residue, e.g., glutamyl or aspartyl; or 4) a residue having a bulky side chain, e.g., phenylalanine, is substituted for (or by) a residue that does not have a side chain, e.g., glycine.

It is understood, however, that substitutions at the recited amino acid positions can be made using any amino acid or amino acid analog. For example, the substitutions at the recited positions can be made with any of the naturally-occurring amino acids (e.g., alanine, aspartic acid, asparagine, arginine, cysteine, glycine, glutamic acid, glutamine, histidine, leucine, valine, isoleucine, lysine, methionine, proline, threonine, serine, phenylalanine, tryptophan, or tyrosine).

B. Formulations

The peptide described herein can be formulated for enteral, parenteral, or pulmonary administration. In a preferred embodiment, the peptide is formulated for pulmonary administration.

P9R (or peptides derived thereform) can be combined with one or more pharmaceutically acceptable carriers and/or excipients that are considered safe and effective and may be administered to an individual without causing undesirable biological side effects or unwanted interactions. The carrier is all components present in the pharmaceutical formulation other than the active ingredient or ingredients.

The P9R (or peptides derived thereform) disclosed herein can also be formulated for use as a disinfectant, for example, in a hospital environment.

1. Pulmonary Formulations

In one embodiment, the P9R (or P9R-like peptides) are formulated for pulmonary delivery, such as intranasal administration or oral inhalation.

The respiratory tract is the structure involved in the exchange of gases between the atmosphere and the blood stream. The lungs are branching structures ultimately ending with the alveoli where the exchange of gases occurs. The alveolar surface area is the largest in the respiratory system and is where drug absorption occurs. The alveoli are covered by a thin epithelium without cilia or a mucus blanket and secrete surfactant phospholipids. The respiratory tract encompasses the upper airways, including the oropharynx and larynx, followed by the lower airways, which include the trachea followed by bifurcations into the bronchi and bronchioli. The upper and lower airways are called the conducting airways. The terminal bronchioli then divide into respiratory bronchiole, which then lead to the ultimate respiratory zone, the alveoli, or deep lung. The deep lung, or alveoli, is the primary target of inhaled therapeutic aerosols for systemic drug delivery.

Pulmonary administration of therapeutic compositions including low molecular weight drugs has been observed, for example, beta-androgenic antagonists to treat asthma. Other therapeutic agents that are active in the lungs have been administered systemically and targeted via pulmonary absorption. Nasal delivery is considered to be a promising technique for administration of therapeutics for the following reasons: the nose has a large surface area available for drug absorption due to the coverage of the epithelial surface by numerous microvilli, the sub epithelial layer is highly vascularized, the venous blood from the nose passes directly into the systemic circulation and therefore avoids the loss of drug by first-pass metabolism in the liver, it offers lower doses, more rapid attainment of therapeutic blood levels, quicker onset of pharmacological activity, fewer side effects, high total blood flow per cm3, porous endothelial basement membrane, and it is easily accessible.

Carriers for pulmonary formulations can be divided into those for dry powder formulations and for administration as solutions. Aerosols for the delivery of therapeutic agents to the respiratory tract are known in the art. Aerosols can be produced using standard techniques, such as ultrasonication or high-pressure treatment. For administration via the upper respiratory tract, the formulation can be formulated into a solution, e.g., water or isotonic saline, buffered or unbuffered, or as a suspension, for intranasal administration as drops or as a spray. Preferably, such solutions or suspensions are isotonic relative to nasal secretions and of about the same pH, ranging e.g., from about pH 4.0 to about pH 7.4 or, from pH 6.0 to pH 7.0. Buffers should be physiologically compatible and include, simply by way of example, phosphate buffers. For example, a representative nasal decongestant is described as being buffered to a pH of about 6.2. One skilled in the art can readily determine a suitable saline content and pH for an innocuous aqueous solution for nasal and/or upper respiratory administration.

Preferably, the aqueous solution is water, physiologically acceptable aqueous solutions containing salts and/or buffers, such as phosphate buffered saline (PBS), or any other aqueous solution acceptable for administration to an animal or human. Such solutions are well known to a person skilled in the art and include, but are not limited to, distilled water, de-ionized water, pure or ultrapure water, saline, phosphate-buffered saline (PBS). Other suitable aqueous vehicles include, but are not limited to, Ringer's solution and isotonic sodium chloride. Aqueous suspensions may include suspending agents such as cellulose derivatives, sodium alginate, polyvinyl-pyrrolidone and gum tragacanth, and a wetting agent such as lecithin. Suitable preservatives for aqueous suspensions include ethyl and n-propyl p-hydroxybenzoate.

Solvents that are low toxicity organic (i.e. nonaqueous) class 3 residual solvents, such as ethanol, acetone, ethyl acetate, tetrahydofuran, ethyl ether, and propanol may be used for the formulations. The solvent is selected based on its ability to readily aerosolize the formulation. The solvent should not detrimentally react with the P9R (or P9R-like peptides). An appropriate solvent should be used that dissolves the compounds or forms a suspension of P9R (or P9R-like peptides). The solvent should be sufficiently volatile to enable formation of an aerosol of the solution or suspension. Additional solvents or aerosolizing agents, such as freons, can be added as desired to increase the volatility of the solution or suspension.

In one embodiment, compositions may contain minor amounts of polymers, surfactants, or other excipients well known to those of the art. In this context, "minor amounts" means no excipients are present that might affect or mediate uptake of P9R (or P9R-like peptides) in the lungs and that the excipients that are present are present in amount that do not adversely affect uptake of P9R (or P9R-like peptides) in the lungs.

Dry lipid powders can be directly dispersed in ethanol because of their hydrophobic character. For lipids stored in organic solvents such as chloroform, the desired quantity of solution is placed in a vial, and the chloroform is evaporated under a stream of nitrogen to form a dry thin film on the surface of a glass vial. The film swells easily when reconstituted with ethanol. To fully disperse the lipid molecules in the organic solvent, the suspension is sonicated. Nonaqueous suspensions of lipids can also be prepared in absolute ethanol using a reusable PARI LC Jet+ nebulizer (PARI Respiratory Equipment, Monterey, CA).

Dry powder formulations ("DPFs") with large particle size have improved flowability characteristics, such as less aggregation, easier aerosolization, and potentially less phagocytosis. Dry powder aerosols for inhalation therapy are generally produced with mean diameters primarily in the range of less than 5 microns, although a preferred range is between one and ten microns in aerodynamic diameter. Large "carrier" particles (containing no drug) have been co-delivered with therapeutic aerosols to aid in achieving efficient aerosolization among other possible benefits.

Polymeric particles may be prepared using single and double emulsion solvent evaporation, spray drying, solvent extraction, solvent evaporation, phase separation, simple and complex coacervation, interfacial polymerization, and other methods well known to those of ordinary skill in the art. Particles may be made using methods for making microspheres or microcapsules known in the art. The preferred methods of manufacture are by spray drying and freeze drying, which entails using a solution containing the surfactant, spraying to form droplets of the desired size, and removing the solvent.

The particles may be fabricated with the appropriate material, surface roughness, diameter and tap density for localized delivery to selected regions of the respiratory tract such as the deep lung or upper airways. For example, higher density or larger particles may be used for upper airway delivery. Similarly, a mixture of different sized particles, provided with the same or different EGS may be administered to target different regions of the lung in one administration.

Formulations for pulmonary delivery include unilamellar phospholipid vesicles, liposomes, or lipoprotein particles. Formulations and methods of making such formulations containing nucleic acid are well known to one of ordinary skill in the art. Liposomes are formed from commercially available phospholipids supplied by a variety of vendors including Avanti Polar Lipids, Inc. (Birmingham, Ala.). In one embodiment, the liposome can include a ligand molecule specific for a receptor on the surface of the target cell to direct the liposome to the target cell.

2. Parenteral Formulations

P9R (or P9R-like peptides) described herein can be formulated for parenteral administration.

For example, parenteral administration may include administration to a patient intravenously, intradermally, intraarterially, intraperitoneally, intracranially, intraarticularly, intraprostatically, intrapleurally, intratracheally, intravitreally, intratumorally, intramuscularly, subcutaneously, subconjunctivally, intravesicularly, intrapericardially, intraumbilically, by injection, and by infusion.

Parenteral formulations can be prepared as aqueous compositions using techniques is known in the art. Typically, such compositions can be prepared as injectable formulations, for example, solutions or suspensions; solid forms suitable for using to prepare solutions or suspensions upon the addition of a reconstitution medium prior to injection; emulsions, such as water-in-oil (w/o) emulsions, oil-in-water (o/w) emulsions, and microemulsions thereof, liposomes, or emulsomes.

The carrier can be a solvent or dispersion medium containing, for example, water, ethanol, one or more polyols (e.g., glycerol, propylene glycol, and liquid polyethylene glycol), oils, such as vegetable oils (e.g., peanut oil, corn oil, sesame oil, etc.), and combinations thereof. The proper fluidity can be maintained, for example, by the use of a coating, such as lecithin, by the maintenance of the required particle size in the case of dispersion and/or by the use of surfactants. In many cases, it will be preferable to include isotonic agents, for example, sugars or sodium chloride.

Solutions and dispersions of the active compounds as the free acid or base or pharmacologically acceptable salts thereof can be prepared in water or another solvent or dispersing medium suitably mixed with one or more pharmaceutically acceptable excipients including, but not limited to, surfactants, dispersants, emulsifiers, pH modifying agents, viscosity modifying agents, and combination thereof.

Suitable surfactants may be anionic, cationic, amphoteric or nonionic surface-active agents. Suitable anionic surfactants include, but are not limited to, those containing carboxylate, sulfonate and sulfate ions. Examples of anionic surfactants include sodium, potassium, ammonium of long chain alkyl sulfonates and alkyl aryl sulfonates such as sodium dodecylbenzene sulfonate; dialkyl sodium sulfosuccinates, such as sodium dodecylbenzene sulfonate; dialkyl sodium sulfosuccinates, such as sodium bis-(2-ethylthioxyl)-sulfosuccinate; and alkyl sulfates such as sodium lauryl sulfate. Cationic surfactants include, but are not limited to, quaternary ammonium compounds such as benzalkonium chloride, benzethonium chloride, cetrimonium bromide, stearyl dimethylbenzyl ammonium chloride, polyoxyethylene and coconut amine. Examples of nonionic surfactants include ethylene glycol monostearate, propylene glycol myristate, glyceryl monostearate, glyceryl stearate, polyglyceryl-4-oleate, sorbitan acylate, sucrose acylate, PEG-150 laurate, PEG-400 monolaurate, polyoxyethylene monolaurate, polysorbates, polyoxyethylene octylphenylether, PEG-1000 cetyl ether, polyoxyethylene tridecyl ether, polypropylene glycol butyl ether, Poloxamer® 401, stearoyl monoisopropanolamide, and polyoxyethylene hydrogenated tallow amide. Examples of amphoteric surfactants include sodium N-dodecyl-.beta.-alanine, sodium N-lauryl-.beta.-iminodipropionate, myristoamphoacetate, lauryl betaine and lauryl sulfobetaine.

The formulation can contain a preservative to prevent the growth of microorganisms. Suitable preservatives include, but are not limited to, parabens, chlorobutanol, phenol, sorbic acid, and thimerosal. The formulation may also contain an antioxidant to prevent degradation of the active agent(s).

The formulation is typically buffered to a pH of 3-8 for parenteral administration upon reconstitution. Suitable buffers include, but are not limited to, phosphate buffers, acetate buffers, and citrate buffers.

Water-soluble polymers are often used in formulations for parenteral administration. Suitable water-soluble polymers include, but are not limited to, polyvinylpyrrolidone, dextran, carboxymethylcellulose, and polyethylene glycol.

Sterile injectable solutions can be prepared by incorporating P9R (or P9R-like peptides) in the required amount in the appropriate solvent or dispersion medium with one or more of the excipients listed above, as required, followed by filtered sterilization. Generally, dispersions are prepared by incorporating the various sterilized active ingredients into a sterile vehicle which contains the basic dispersion medium and the required other ingredients from those listed above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof. The powders can be prepared in such a manner that the particles are porous in nature, which can increase dissolution of the particles. Methods for making porous particles are well known in the art.

(a) Controlled Release Formulations

The parenteral formulations described herein can be formulated for controlled release including immediate release, delayed release, extended release, pulsatile release, and combinations thereof.

i. Nano- and Microparticles

For parenteral administration, P9R (or P9R-like peptides), and optional one or more additional active agents, can be incorporated into microparticles, nanoparticles, or combinations thereof that provide controlled release of the disclosed P9R (or P9R-like peptides) and/or one or more additional active agents. In embodiments wherein the formulations contains two or more drugs, the drugs can be formulated for the same type of controlled release (e.g., delayed, extended, immediate, or pulsatile) or the drugs can be independently formulated for different types of release (e.g., immediate and delayed, immediate and extended, delayed and extended, delayed and pulsatile, etc.).

For example, the P9R (or P9R-like peptides) and/or one or more additional active agents can be incorporated into polymeric microparticles, which provide controlled release of the drug(s). Release of the drug(s) is controlled by diffusion of the drug(s) out of the microparticles and/or degradation of the polymeric particles by hydrolysis and/or enzymatic degradation. Suitable polymers include ethylcellulose and other natural or synthetic cellulose derivatives.

Polymers, which are slowly soluble and form a gel in an aqueous environment, such as hydroxypropyl methylcellulose or polyethylene oxide, can also be suitable as materials for drug containing microparticles. Other polymers include, but are not limited to, polyanhydrides, poly(ester anhydrides), polyhydroxy acids, such as polylactide (PLA), polyglycolide (PGA), poly(lactide-co-glycolide) (PLGA), poly-3-hydroxybutyrate (PHB) and copolymers thereof, poly-4-hydroxybutyrate (P4HB) and copolymers thereof, polycaprolactone and copolymers thereof, and combinations thereof.

Alternatively, the drug(s) can be incorporated into microparticles prepared from materials which are insoluble in aqueous solution or slowly soluble in aqueous solution, but are capable of degrading within the GI tract by means including enzymatic degradation, surfactant action of bile acids, and/or mechanical erosion. As used herein, the term "slowly soluble in water" refers to materials that are not dissolved in water within a period of 30 minutes. Preferred examples include fats, fatty substances, waxes, wax-like substances and mixtures thereof. Suitable fats and fatty substances include fatty alcohols (such as lauryl, myristyl stearyl, cetyl or cetostearyl alcohol), fatty acids and derivatives, including but not limited to fatty acid esters, fatty acid glycerides (mono-, di- and tri-glycerides), and hydrogenated fats. Specific examples include, but are not limited to hydrogenated vegetable oil, hydrogenated cottonseed oil, hydrogenated castor oil, hydrogenated oils available under the trade name Sterotex®, stearic acid, cocoa butter, and stearyl alcohol. Suitable waxes and wax-like materials include natural or synthetic waxes, hydrocarbons, and normal waxes. Specific examples of waxes include beeswax, glycowax, castor wax, carnauba wax, paraffins and candelilla wax. As used herein, a wax-like material is defined as any material, which is normally solid at room temperature and has a melting point of from about 30 to 300° C.

In some cases, it may be desirable to alter the rate of water penetration into the microparticles. To this end, rate-controlling (wicking) agents can be formulated along with the fats or waxes listed above. Examples of rate-controlling materials include certain starch derivatives (e.g., waxy maltodextrin and drum dried corn starch), cellulose derivatives (e.g., hydroxypropylmethyl-cellulose, hydroxypropylcellulose, methylcellulose, and carboxymethyl-cellulose), alginic acid, lactose and talc. Additionally, a pharmaceutically acceptable surfactant (for example, lecithin) may be added to facilitate the degradation of such microparticles.

Proteins, which are water insoluble, such as zein, can also be used as materials for the formation of drug containing microparticles. Additionally, proteins, polysaccharides and combinations thereof, which are water-soluble, can be formulated with drug into microparticles and subsequently cross-linked to form an insoluble network. For example, cyclodextrins can be complexed with individual drug molecules and subsequently cross-linked.

ii. Method of Making Nano- and Microparticles

Encapsulation or incorporation of drug into carrier materials to produce drug-containing microparticles can be achieved through known pharmaceutical formulation techniques. In the case of formulation in fats, waxes or wax-like materials, the carrier material is typically heated above its melting temperature and the drug is added to form a mixture comprising drug particles suspended in the carrier material, drug dissolved in the carrier material, or a mixture thereof. Microparticles can be subsequently formulated through several methods including, but not limited to, the processes of congealing, extrusion, spray chilling or aqueous dispersion. In a preferred process, wax is heated above its melting temperature, drug is added, and the molten wax-drug mixture is congealed under constant stirring as the mixture cools. Alternatively, the molten wax-drug mixture can be extruded and spheronized to form pellets or beads. These processes are known in the art.

For some carrier materials it may be desirable to use a solvent evaporation technique to produce drug-containing microparticles. In this case drug and carrier material are co-dissolved in a mutual solvent and microparticles can subsequently be produced by several techniques including, but not limited to, forming an emulsion in water or other appropriate media, spray drying or by evaporating off the solvent from the bulk solution and milling the resulting material.

In some embodiments, drug in a particulate form is homogeneously dispersed in a water-insoluble or slowly water soluble material. To minimize the size of the drug particles within the composition, the drug powder itself may be milled to generate fine particles prior to formulation. The process of jet milling, known in the pharmaceutical art, can be used for this purpose. In some embodiments drug in a particulate form is homogeneously dispersed in a wax or wax like substance by heating the wax or wax like substance above its melting point and adding the drug particles while stirring the mixture. In this case a pharmaceutically acceptable surfactant may be added to the mixture to facilitate the dispersion of the drug particles.

The particles can also be coated with one or more modified release coatings. Solid esters of fatty acids, which are hydrolyzed by lipases, can be spray coated onto microparticles or drug particles. Zein is an example of a naturally water-insoluble protein. It can be coated onto drug containing microparticles or drug particles by spray coating or by wet granulation techniques. In addition to naturally water-insoluble materials, some substrates of digestive enzymes can be treated with cross-linking procedures, resulting in the formation of non-soluble networks. Many methods of cross-linking proteins, initiated by both chemical and physical means, have been reported. One of the most common methods to obtain cross-linking is the use of chemical cross-linking agents. Examples of chemical cross-linking agents include aldehydes (gluteraldehyde and formaldehyde), epoxy compounds, carbodiimides, and genipin. In addition to these cross-linking agents, oxidized and native sugars have been used to cross-link gelatin. Cross-linking can also be accomplished using enzymatic means; for example, transglutaminase has been approved as a GRAS substance for cross-linking seafood products. Finally, cross-linking can be initiated by physical means such as thermal treatment, UV irradiation and gamma irradiation.

To produce a coating layer of cross-linked protein surrounding drug containing microparticles or drug particles, a water-soluble protein can be spray coated onto the microparticles and subsequently cross-linked by the one of the methods described above. Alternatively, drug-containing microparticles can be microencapsulated within protein by coacervation-phase separation (for example, by the addition of salts) and subsequently cross-linked. Some suitable proteins for this purpose include gelatin, albumin, casein, and gluten.

Polysaccharides can also be cross-linked to form a water-insoluble network. For many polysaccharides, this can be accomplished by reaction with calcium salts or multivalent cations, which cross-link the main polymer chains. Pectin, alginate, dextran, amylose and guar gum are subject to cross-linking in the presence of multivalent cations. Complexes between oppositely charged polysaccharides can also be formed; pectin and chitosan, for example, can be complexed via electrostatic interactions.

(b) Injectable/Implantable Formulations

The P9R (or P9R-like peptides) described herein can be incorporated into injectable/implantable solid or semi-solid implants, such as polymeric implants. In one embodiment, the P9R (or.P9R-like peptides) are incorporated into a polymer that is a liquid or paste at room temperature, but upon contact with aqueous medium, such as physiological fluids, exhibits an increase in viscosity to form a semi-solid or solid material. Exemplary polymers include, but are not limited to, hydroxyalkanoic acid polyesters derived from the copolymerization of at least one unsaturated hydroxy fatty acid copolymerized with hydroxyalkanoic acids. The polymer can be melted, mixed with the active substance and cast or injection molded into a device. Such melt fabrication require polymers having a melting point that is below the temperature at which the substance to be delivered and polymer degrade or become reactive. The device can also be prepared by solvent casting where the polymer is dissolved in a solvent and the drug dissolved or dispersed in the polymer solution and the solvent is then evaporated. Solvent processes require that the polymer be soluble in organic solvents. Another method is compression molding of a mixed powder of the polymer and the drug or polymer particles loaded with the active agent.

Alternatively, P9R (or P9R-like peptides) can be incorporated into a polymer matrix and molded, compressed, or extruded into a device that is a solid at room temperature. For example, P9R (or P9R-like peptides) can be incorporated into a biodegradable polymer, such as polyanhydrides, polyhydroalkanoic acids (PHAs), PLA, PGA, PLGA, polycaprolactone, polyesters, polyamides, polyorthoesters, polyphosphazenes, proteins and polysaccharides such as collagen, hyaluronic acid, albumin and gelatin, and combinations thereof and compressed into solid device, such as disks, or extruded into a device, such as rods.

The release of the peptide from the implant can be varied by selection of the polymer, the molecular weight of the polymer, and/or modification of the polymer to increase degradation, such as the formation of pores and/or incorporation of hydrolyzable linkages. Methods for modifying the properties of biodegradable polymers to vary the release profile of the compounds from the implant are well known in the art.

3. Enteral Formulations

Suitable oral dosage forms include tablets, capsules, solutions, suspensions, syrups, and lozenges. Tablets can be made using compression or molding techniques well known in the art. Gelatin or non-gelatin capsules can prepared as hard or soft capsule shells, which can encapsulate liquid, solid, and semi-solid fill materials, using techniques well known in the art. IN embodiments where the formulation is for oral administration involving transit through the gastrointestinal tract, the formulation is preferably coated to protect the peptide from gastrointestinal enzymes.

Formulations may be prepared using a pharmaceutically acceptable carrier. As generally used herein "carrier" includes, but is not limited to, diluents, preservatives, binders, lubricants, disintegrators, swelling agents, fillers, stabilizers, and combinations thereof.

Carrier also includes all components of the coating composition, which may include plasticizers, pigments, colorants, stabilizing agents, and glidants.

Examples of suitable coating materials include, but are not limited to, cellulose polymers such as cellulose acetate phthalate, hydroxypropyl cellulose, hydroxypropyl methylcellulose, hydroxypropyl methylcellulose phthalate and hydroxypropyl methylcellulose acetate succinate; polyvinyl acetate phthalate, acrylic acid polymers and copolymers, and methacrylic resins that are commercially available under the trade name EUDRAGIT® (Roth Pharma, Westerstadt, Germany), zein, shellac, and polysaccharides.

Additionally, the coating material may contain conventional carriers such as plasticizers, pigments, colorants, glidants, stabilization agents, pore formers and surfactants.

"Diluents", also referred to as "fillers," are typically necessary to increase the bulk of a solid dosage form so that a practical size is provided for compression of tablets or formation of beads and granules. Suitable diluents include, but are not limited to, dicalcium phosphate dihydrate, calcium sulfate, lactose, sucrose, mannitol, sorbitol, cellulose, microcrystalline cellulose, kaolin, sodium chloride, dry starch, hydrolyzed starches, pregelatinized starch, silicone dioxide, titanium oxide, magnesium aluminum silicate and powdered sugar.

"Binders" are used to impart cohesive qualities to a solid dosage formulation, and thus ensure that a tablet or bead or granule remains intact after the formation of the dosage forms. Suitable binder materials include, but are not limited to, starch, pregelatinized starch, gelatin, sugars (including sucrose, glucose, dextrose, lactose and sorbitol), polyethylene glycol, waxes, natural and synthetic gums such as acacia, tragacanth, sodium alginate, cellulose, including hydroxypropylmethylcellulose, hydroxypropylcellulose, ethylcellulose, and veegum, and synthetic polymers such as acrylic acid and methacrylic acid copolymers, methacrylic acid copolymers, methyl methacrylate copolymers, aminoalkyl methacrylate copolymers, polyacrylic acid/polymethacrylic acid and polyvinylpyrrolidone.

"Lubricants" are used to facilitate tablet manufacture. Examples of suitable lubricants include, but are not limited to, magnesium stearate, calcium stearate, stearic acid, glycerol behenate, polyethylene glycol, talc, and mineral oil.

"Disintegrants" are used to facilitate dosage form disintegration or "breakup" after administration, and generally include, but are not limited to, starch, sodium starch glycolate, sodium carboxymethyl starch, sodium carboxymethylcellulose, hydroxypropyl cellulose, pregelatinized starch, clays, cellulose, alginine, gums or cross linked polymers, such as cross-linked PVP (Polyplasdone® XL from GAF Chemical Corp).

"Stabilizers" are used to inhibit or retard drug decomposition reactions, which include, by way of example, oxidative reactions. Suitable stabilizers include, but are not limited to, antioxidants, butylated hydroxytoluene (BHT); ascorbic acid, its salts and esters; Vitamin E, tocopherol and its salts; sulfites such as sodium metabisulphite; cysteine and its derivatives; citric acid; propyl gallate, and butylated hydroxyanisole (BHA).

(a) Controlled Release Enteral Formulations

Oral dosage forms, such as capsules, tablets, solutions, and suspensions, can for formulated for controlled release. For example, P9R (or P9R-like peptides) and optional one or more additional active agents can be formulated into nanoparticles, microparticles, and combinations thereof, and encapsulated in a soft or hard gelatin or non-gelatin capsule or dispersed in a dispersing medium to form an oral suspension or syrup. The particles can be formed of the drug and a controlled release polymer or matrix. Alternatively, the drug particles can be coated with one or more controlled release coatings prior to incorporation in to the finished dosage form.

In another embodiment, the P9R (or P9R-like peptides) and optional one or more additional active agents are dispersed in a matrix material, which gels or emulsifies upon contact with an aqueous medium, such as physiological fluids. In the case of gels, the matrix swells entrapping the active agents, which are released slowly over time by diffusion and/or degradation of the matrix material. Such matrices can be formulated as tablets or as fill materials for hard and soft capsules.

In still another embodiment, the P9R (or P9R-like peptides), and optional one or more additional active agents are formulated into a sold oral dosage form, such as a tablet or capsule, and the solid dosage form is coated with one or more controlled release coatings, such as a delayed release coatings or extended release coatings. The coating or coatings may also contain the P9R (or P9R-like peptides) and/or additional active agents.

i. Extended Release Dosage Forms

The extended release formulations are generally prepared as diffusion or osmotic systems, which are known in the art. A diffusion system typically consists of two types of devices, a reservoir and a matrix, and is well known and described in the art. The matrix devices are generally prepared by compressing the drug with a slowly dissolving polymer carrier into a tablet form. The three major types of materials used in the preparation of matrix devices are insoluble plastics, hydrophilic polymers, and fatty compounds. Plastic matrices include, but are not limited to, methyl acrylate-methyl methacrylate, polyvinyl chloride, and polyethylene. Hydrophilic polymers include, but are not limited to, cellulosic polymers such as methyl and ethyl cellulose, hydroxyalkylcelluloses such as hydroxypropyl-cellulose, hydroxypropylmethylcellulose, sodium carboxymethylcellulose, and Carbopol® 934, polyethylene oxides and mixtures thereof. Fatty compounds include, but are not limited to, various waxes such as carnauba wax and glyceryl tristearate and wax-type substances including hydrogenated castor oil or hydrogenated vegetable oil, or mixtures thereof.

In certain preferred embodiments, the plastic material is a pharmaceutically acceptable acrylic polymer, including but not limited to, acrylic acid and methacrylic acid copolymers, methyl methacrylate, methyl methacrylate copolymers, ethoxyethyl methacrylates, cyanoethyl methacrylate, aminoalkyl methacrylate copolymer, poly(acrylic acid), poly (methacrylic acid), methacrylic acid alkylamine copolymer poly(methyl methacrylate), poly(methacrylic acid) (anhydride), polymethacrylate, polyacrylamide, poly(methacrylic acid anhydride), and glycidyl methacrylate copolymers.

In certain preferred embodiments, the acrylic polymer is comprised of one or more ammonio methacrylate copolymers. Ammonio methacrylate copolymers are well known in the art, and are described in NF XVII as fully polymerized copolymers of acrylic and methacrylic acid esters with a low content of quaternary ammonium groups.

In one preferred embodiment, the acrylic polymer is an acrylic resin lacquer such as that which is commercially available from Rohm Pharma under the tradename EUDRAGIT t®. In further preferred embodiments, the acrylic polymer comprises a mixture of two acrylic resin lacquers commercially available from Rohm Pharma under the tradenames EUDRAGIT® RL30D and EUDRAGIT® RS30D, respectively. EUDRAGIT® RL30D and EUDRAGIT® RS30D are copolymers of acrylic and methacrylic esters with a low content of quaternary ammonium groups, the molar ratio of ammonium groups to the remaining neutral (meth)acrylic esters being 1:20 in EUDRAGIT® RL30D and 1:40 in EUDRAGIT® RS30D. The mean molecular weight is about 150,000. EUDRAGIT® S-100 and EUDRAGIT® L-100 are also preferred. The code designations RL (high permeability) and RS (low permeability) refer to the permeability properties of these agents. EUDRAGIT® RL/RS mixtures are insoluble in water and in digestive fluids. However, multiparticulate systems formed to include the same are swellable and permeable in aqueous solutions and digestive fluids.

The polymers described above such as EUDRAGIT® RL/RS may be mixed together in any desired ratio in order to ultimately obtain a sustained-release formulation having a desirable dissolution profile. Desirable sustained-release multiparticulate systems may be obtained, for instance, from 100% EUDRAGIT® RL, 50% EUDRAGIT® RL and 50% EUDRAGIT t® RS, and 10% EUDRAGIT® RL and 90% EUDRAGIT® RS. One skilled in the art will recognize that other acrylic polymers may also be used, such as, for example, EUDRAGIT® L.

Alternatively, extended release formulations can be prepared using osmotic systems or by applying a semi-permeable coating to the dosage form. In the latter case, the desired drug release profile can be achieved by combining low permeable and high permeable coating materials in suitable proportion.

The devices with different drug release mechanisms described above can be combined in a final dosage form comprising single or multiple units. Examples of multiple units include, but are not limited to, multilayer tablets and capsules containing tablets, beads, or granules An immediate release portion can be added to the extended release system by means of either applying an immediate release layer on top of the extended release core using a coating or compression process or in a multiple unit system such as a capsule containing extended and immediate release beads.

Extended release tablets containing hydrophilic polymers are prepared by techniques commonly known in the art such as direct compression, wet granulation, or dry granulation. Their formulations usually incorporate polymers, diluents, binders, and lubricants as well as the active pharmaceutical ingredient. The usual diluents include inert powdered substances such as starches, powdered cellulose, especially crystalline and microcrystalline cellulose, sugars such as fructose, mannitol and sucrose, grain flours and similar edible powders. Typical diluents include, for example, various types of starch, lactose, mannitol, kaolin, calcium phosphate or sulfate, inorganic salts such as sodium chloride and powdered sugar. Powdered cellulose derivatives are also useful. Typical tablet binders include substances such as starch, gelatin and sugars such as lactose, fructose, and glucose. Natural and synthetic gums, including acacia, alginates, methylcellulose, and polyvinylpyrrolidone can also be used. Polyethylene glycol, hydrophilic polymers, ethylcellulose and waxes can also serve as binders. A lubricant is necessary in a tablet formulation to prevent the tablet and punches from sticking in the die. The lubricant is chosen from such slippery solids as talc, magnesium and calcium stearate, stearic acid and hydrogenated vegetable oils.

Extended release tablets containing wax materials are generally prepared using methods known in the art such as a direct blend method, a congealing method, and an aqueous dispersion method. In the congealing method, the drug is mixed with a wax material and either spray-congealed or congealed and screened and processed.

ii. Delayed Release Dosage Forms

Delayed release formulations can be created by coating a solid dosage form with a polymer film, which is insoluble in the acidic environment of the stomach, and soluble in the neutral environment of the small intestine.

The delayed release dosage units can be prepared, for example, by coating a drug or a drug-containing composition with a selected coating material. The drug-containing composition may be, e.g., a tablet for incorporation into a capsule, a tablet for use as an inner core in a "coated core" dosage form, or a plurality of drug-containing beads, particles or granules, for incorporation into either a tablet or capsule. Preferred coating materials include bioerodible, gradually hydrolyzable, gradually water-soluble, and/or enzymatically degradable polymers, and may be conventional "enteric" polymers. Enteric polymers, as will be appreciated by those skilled in the art, become soluble in the higher pH environment of the lower gastrointestinal tract or slowly erode as the dosage form passes through the gastrointestinal tract, while enzymatically degradable polymers are degraded by bacterial enzymes present in the lower gastrointestinal tract, particularly in the colon. Suitable coating materials for effecting delayed release include, but are not limited to, cellulosic polymers such as hydroxypropyl cellulose, hydroxyethyl cellulose, hydroxymethyl cellulose, hydroxypropyl methyl cellulose, hydroxypropyl methyl cellulose acetate succinate, hydroxypropylmethyl cellulose phthalate, methylcellulose, ethyl cellulose, cellulose acetate, cellulose acetate phthalate, cellulose acetate trimellitate and carboxymethylcellulose sodium; acrylic acid polymers and copolymers, preferably formed from acrylic acid, methacrylic acid, methyl acrylate, ethyl acrylate, methyl methacrylate and/or ethyl methacrylate, and other methacrylic resins that are commercially available under the tradename Eudragit® (Rohm Pharma; Westerstadt, Germany), including EUDRAGIT® L30D-55 and L100-55 (soluble at pH 5.5 and above), EUDRAGIT® L-100 (soluble at pH 6.0 and above), EUDRAGIT® S (soluble at pH 7.0 and above, as a result of a higher degree of esterification), and EUDRAGITS® NE, RL and RS (water-insoluble polymers having different degrees of permeability and expandability); vinyl polymers and copolymers such as polyvinyl pyrrolidone, vinyl acetate, vinylacetate phthalate, vinylacetate crotonic acid copolymer, and ethylene-vinyl acetate copolymer; enzymatically degradable polymers such as azo polymers, pectin, chitosan, amylose and guar gum; zein and shellac. Combinations of different coating materials may also be used. Multi-layer coatings using different polymers may also be applied.

The preferred coating weights for particular coating materials may be readily determined by those skilled in the art by evaluating individual release profiles for tablets, beads and granules prepared with different quantities of various coating materials. It is the combination of materials, method and form of application that produce the desired release characteristics, which one can determine only from the clinical studies.

The coating composition may include conventional additives, such as plasticizers, pigments, colorants, stabilizing agents, glidants, etc. A plasticizer is normally present to reduce the fragility of the coating, and will generally represent about 10 wt. % to 50 wt. % relative to the dry weight of the polymer. Examples of typical plasticizers include polyethylene glycol, propylene glycol, triacetin, dimethyl phthalate, diethyl phthalate, dibutyl phthalate, dibutyl sebacate, triethyl citrate, tributyl citrate, triethyl acetyl citrate, castor oil and acetylated monoglycerides. A stabilizing agent is preferably used to stabilize particles in the dispersion. Typical stabilizing agents are nonionic emulsifiers such as sorbitan esters, polysorbates and polyvinylpyrrolidone. Glidants are recommended to reduce sticking effects during film formation and drying, and will generally represent approximately 25 wt. % to 100 wt. % of the polymer weight in the coating solution. One effective glidant is talc. Other glidants such as magnesium stearate and glycerol monostearates may also be used. Pigments such as titanium dioxide may also be used. Small quantities of an anti-foaming agent, such as a silicone (e.g., simethicone), may also be added to the coating composition.

III. Methods of Using

The disclosed methods are based on studies showing that P9R exhibits very broad-spectrum antiviral activities against the enveloped SARS-CoV-2, MERS-CoV, SARS-CoV, A(H1N1)pdm09, A(H7N9) virus, and the non-enveloped rhinovirus. P9R efficiently protects from a viral challenge when administered in vivo, as demonstrated by its protection of mice (following in vivo administration) from lethal A(H1N1)pdm09 virus challenge. P9R did not cause emergency of drug-resistant virus even after A(H1N1)pdm09 virus was passaged in the presence of P9R for 40 passages. Mechanistic studies indicated that the antiviral activity of P9R depended on the direct binding to viruses and the inhibition of virus-host endosomal acidification, which provides a new concept that virus-binding alkaline peptides could broadly inhibit pH-dependent viruses.

Accordingly, methods are provided for treating a subject infected with a virus, by administering the subjected a formulation containing an effective amount of the disclosed peptides, to ameliorate one or more symptoms associated with the viral infection. In a preferred embodiment, the treatment is effective to inhibit viral replication in the subject. The subject can be treated with the disclosed peptides by administering an effective amount of the peptide to the subject, enterally, by pulmonary or nasal administration, or parenterally (intravenously, intradermally, intraarterially, intraperitoneally, intracranially, intraarticularly, intraprostatically, intrapleurally, intratracheally, intravitreally, intratumorally, intramuscularly, subcutaneously, subconjunctivally, intravesicularly, intrapericardially, intraumbilically, by injection, and by infusion.

The virus is preferably a respiratory virus, and more preferably, a pH-dependent respiratory virus. Respiratory viruses are the most frequent causative agents of disease in humans, with significant impact on morbidity and mortality worldwide, mainly in children. Approximately one-fifth of all childhood deaths worldwide are related to acute respiratory infections (ARIs), particularly in impoverished populations of tropical regions, where ARI case-to-fatality ratios can be remarkably higher than in temperate regions of the world. Eight human respiratory viruses circulate commonly in all age groups and are recognized as adapted to efficient person-to-person transmission; the include HRSV (human respiratory syncytial virus), HPIV (human parainfluenza Virus), HRV (human rhinovirus), ADV (adenovirus), HCoV (human coronavirus) (HCoV-NL63, HCoV-HKU1), SARS-CoV, HMP (human metapneumovirus) HPIV (human parainfluenza virus) and HBOV (human bocavirus). HRSV internalization is considered to be pH-independent and may happen either in plasma or in endosomal membranes.

Exemplary viral infections that can be treated with the disclosed formulations include, but are not limited to zika virus, enterovirus-A7, ebola virus, influenza virus, HRSV, HPIV, HRV, ADV, HPIV, HCOV, SARS-CoV-2, MERS-CoV, SARS-CoV, A(H1N1)pdm09, A(H7N9) virus, and the non-enveloped rhinovirus.

The following non-limiting examples further explain the disclosed and claimed compositions and methods.

EXAMPLES

Material and Methods

Cells and Virus Culture

Madin Darby canine kidney (MDCK, CCL-34), Vero E6 (CRL-1586), RD (CCL136), LLC-MK2 (CCL-7), A549 (CCL-185) cells obtained from ATCC (Manassas, VA, USA) were cultured in Dulbecco minimal essential medium (DMEM) or MEM supplemented with 10% fetal bovine serum (FBS), 100 IU $ml^{-1}$ penicillin and 100 μg $ml^{-1}$ streptomycin. The virus strains used in this study included 2019 new coronavirus (SARS-CoV-2)[43], SARS-CoV, MERS-CoV (hCoV-EMC/2012), A/Hong Kong/415742/2009, A/Hong Kong/415742Md/2009 (H1N1) (a highly virulent mouse-adapted strain), A/Anhui/1/2013 (H7N9)[13], rhinovirus[44] and human parainfluenza 3 (ATCC-C243). For in vitro experiments, viruses were cultured in MDCK, Vero E6, RD and LLC-MK2 cells. For animal experiments, H1N1 virus was cultured in eggs as described previously[45].

Design and Synthesis of Peptides

P9, P9R, PA1 and P9RS were designed as shown in FIG. 1*a* and synthesized by ChinaPeptide (Shanghai, China). The purity of all peptides was>95%. The purity and mass of each peptide were verified by HPLC and mass spectrometry.

Plaque Reduction Assay

Antiviral activity of peptides was measured using a plaque reduction assay as we described previously[14]. Briefly, peptides were dissolved in 30 mM phosphate buffer containing 24.6 mM $Na_2HPO_4$ and 5.6 mM $KH_2PO_4$ at a pH of 7.4. Peptides or bovine serum albumin (BSA, 0.4-50.0 μg $ml^{-1}$) were premixed with 50 PFU of coronaviruses (SARS-CoV-2, MERS-CoV, and SARS-CoV), influenza viruses (H1N1 virus and H7N9 virus), rhinovirus, or parainfluenza 3 in phosphate buffer at room temperature. After 1 h of incubation, peptide-virus mixture was transferred to Vero E6 for coronaviruses, MDCK for influenza viruses, RD for rhinoviruses, or LLC-MK2 for parainfluenza virus. At 1 h post infection, infectious media were removed and 1% low melting agar was added to cells. Cells were fixed using 4% formalin at 2-4 day post infection. Crystal blue (0.1%) was added for staining, and the number of plaques was counted.

Antiviral Multicycle Growth Assay

Coronaviruses (SARS-CoV-2, MERS-CoV, and SARS-CoV), influenza viruses (H1N1 and H7N9 virus) and rhinovirus (0.005 MOI) were premixed with P9R or BSA (50-100 μg $ml^{-1}$) in phosphate buffer for 1 h. After incubation, coronaviruses were inoculated onto Vero E6. Influenza viruses were inoculated onto MDCK cells. Rhinovirus was inoculated onto RD cells. After 1h infection, infectious media were removed and fresh media with supplemented P9R or BSA (50-100 μg $ml^{-1}$) were added to infected cells for virus and cell culture. At 24-30h post infection, the supernatants of cells were collected for detecting viral RNA copies.

Cytotoxicity Assay

Cytotoxicity of peptides was determined by the detection of 50% cytotoxic concentration ($CC_{50}$) using a tetrazolium-based colorimetric MTT assay as we described previously[13]. Briefly, cells were seeded in 96-well cell culture plate at an initial density of $2\times10^4$ cells per well in MEM or DMEM supplemented with 10% FBS and incubated for overnight.

Cell culture media were removed and then DMEM supplemented with various concentrations of peptides and 1% FBS were added to each well. After 24 h incubation at 37° C., MTT solution (5 mg ml-1, 10 μl per well) was added to each well for incubation at 37° C. for 4 h. Then, 100 μl of 10% SDS in 0.01M HCl was added to each well. After further incubation at room temperature with shaking overnight, the plates were read at OD570 using Victor™ X3 Multilabel Reader (PerkinElmer, USA). Cell culture wells without peptides were used as the experiment control and medium only served as a blank control.

Peptide-Virus Binding Assay

Peptides (0.1 μg per well) dissolved in $H_2O$ were coated onto ELISA plates and incubated at 4° C. overnight. Then, 2% BSA was used to block plates at 4° C. overnight. For virus binding to peptides, viruses were diluted in phosphate buffer and then were added to ELISA plate for binding to the coated peptides at room temperature for 1 h. After washing the unbinding viruses, the binding viruses were lysed by RLT buffer of RNeasy Mini Kit (Qiagen, Cat #74106) for viral RNA extraction. Viral RNA copies of binding viruses were measured by RT-qPCR.

ELISA Assay

ELISA assay was done as described previously[14]. Peptides (0.1 μg per well) dissolved in $H_2O$ were coated onto ELISA plates and incubated at 4° C. overnight. Then, 2% BSA was used to block plates at 4° C. overnight. For HA and S binding, 150 ng HA1 or S in solution I buffer (Sino Biological Inc., Cat #11055-V08H4) was incubated with peptides at 37° C. for 1 h. The binding abilities of peptides to HA1 or S proteins were determined by incubation with rabbit anti-His-HRP (Invitrogen, Cat #R93125, 1:2,000) at room temperature for 30 min. The reaction was developed by adding 50 μl of TMB single solution (Life Technologies, Cat #002023) for 15 min at 37° C. and stopped with 50 μl of 1 M $H_2SO_4$. Readings were obtained in an ELISA plate reader (Victor 1420 Multilabel Counter; PerkinElmer) at 450 nm.

Viral RNA Extraction and RT-qPCR

Viral RNA was extracted by Viral RNA Mini Kit (QIAGEN, Cat #52906, USA) according to the manufacturer's instructions. Real-time RT-qPCR was performed as we described previously[14]. Extracted RNA was reverse transcribed to cDNA using PrimeScript II $1^{st}$ Strand cDNA synthesis Kit (Takara, Cat #6210A) using GeneAmp® PCR system 9700 (Applied Biosystems, USA). The cDNA was then amplified using specific primers (Table 1) for detecting SARS-CoV-2, MERS-CoV, SARS-CoV, H1N1, H7N9, and rhinovirus using LightCycle® 480 SYBR Green I Master (Roach, USA).

TABLE 1

RT-qPCR primers

| Gene | Primer | Oligonucleotide sequence (5' to 3') |
|---|---|---|
| SARS-CoV-2 | S-F | CCTACTAAATTAAATGATCTCTGCTTTACT (SEQ ID NO: 5) |
| | S-R | CAAGCTATAACGCAGCCTGTA (SEQ ID NOP: 6) |
| MERS-CoV | NP-F | CAAAACCTTCCCTAAGAAGGAAAAG (SEQ ID NO: 7) |
| | NP-R | GCTCCTTTGGAGGTTCAGACAT (SEQ ID NO: 8) |

TABLE 1-continued

RT-qPCR primers

| Gene | Primer | Oligonucleotide sequence (5' to 3') |
|---|---|---|
| SARS-CoV | NP-F | ACCAGAATGGAGGACGCAAT (SEQ ID NO: 9) |
| | NP-R | GCTGTGAACCAAGACGCAGTATTAT (SEQ ID NO: 10) |
| H1N1 | M-F | CTTCTAACCGAGGTCGAAACG (SEQ ID NO: 11) |
| | M-R | GGC ATTTTGGACAAAKCGTCT A (SEQ ID NO: 12) |
| H7N9 | M-F | CTTCTAACCGAGGTCGAAACG (SEQ ID NO: 13) |
| | M-R | GGC ATTTTGGACAAAKCGTCT A (SEQ ID NO: 14) |
| Rhino-virus | 5'UTR-F | AGCCYGCGTGGCKGCC (SEQ ID NO: 15) |
| | 5'UTR-R | AGCCYGCGTGGTGCCC (SEQ ID NO: 16) |
| | Probe | HEX-TCCGGCCCCTGAATGYGGCTAA-1ABkFQ (SEQ ID NO: 17) |

For quantitation, 10-fold serial dilutions of standard plasmid equivalent to $10^1$ to $10^6$ copies per reaction were prepared to generate the calibration curve. Real-time qPCR experiments were performed using LightCycler® 96 system (Roche, USA).

Endosomal Acidification Assay

Endosomal acidification was detected with a pH-sensitive dye (pHrodo Red dextran, Invitrogen, Cat #P10361) according to the manufacturer's instructions as previously described but with slight modification[14]. First, MDCK cells were treated with BSA (25.0 μg $ml^{-1}$), P9 (25.0 μg $ml^{-1}$), P9R (25.0 μg $ml^{-1}$), PA1 (25.0 μg $ml^{-1}$), or P9RS (25.0 μg$ml^{-1}$) at 4° C. for 15 min. Second, MDCK cells were added with 100 μg $ml^{-1}$ of pH-sensitive dye and DAPI and then incubated at 4° C. for 15 min. Before taking images, cells were further incubated at 37° C. for 15 min and then cells were washed twice with PBS. Finally, PBS was added to cells and images were taken immediately with confocal microscope (Carl Zeiss LSM 700, Germany).

Colocalization Assay of Peptide Binding to Virus in Cells

H1N1 virus was labeled by green Dio dye (Invitrogen, Cat #3898) according to the manufacture introduction. DIO-labeled virus was treated by TAMRA-labeled P9R and TAMRA-labeled P9RS for 1 h at room temperature. Pre-cool MDCK cells were infected by the peptide-treated virus on ice for 15 min and then moved to 37 for incubation for 15 min. Cells were washed twice by PBS and then fixed by 4% formalin for 1h. Nuclei were stained by DAPI for taking images by confocal microscope (Carl Zeiss LSM 700, Germany).

Nucleoprotein (NP) Immunofluorescence Assay.

NP staining was carried out as described previously[14]. MDCK cells were seeded on cell culture slides and were infected with A(H1N1)pdm09 virus at 1 MOI pretreated with BSA (25.0 μg $ml^{-1}$), bafilomycin A1 (50.0 nM) or P9R (25.0 μg $ml^{-1}$). After 3.5 h post infection, cells were fixed with 4% formalin for 1 h and then permeabilized with 0.2% Triton X-100 in PBS for 5 min. Cells were washed by PBS and then blocked by 5% BSA at room temperature for 1 h. Cells were incubated with mouse IgG anti-NP (Millipore, Cat #2817019, 1:600) at room temperature for 1 h and then washed by PBS for next incubation with goat anti-mouse IgG Alexa-488 (Life Technologies, Cat #1752514, 1:600) at room temperature for 1 h. Finally, cells were washed by PBS and stained with DAPI. Images were taken by confocal microscope (Carl Zeiss LSM 700, Germany).

NMR Structure Analysis of P9R

Freshly prepared 1 mg $ml^{-1}$ (0.29 mM) of P9R in 0.5 ml solvent was used for the NMR study. Data were collected in $H_2O/D_2O$ (19:1 v/v), as well as 99.996% $D_2O$, with the internal reference trimethylsilylpropanoic acid. All NMR spectra were acquired on either a Bruker AVANCE III 600 MHz spectrometer (Bruker BioSpin, Germany) or a Bruker AVANCE III 700 MHz spectrometer at 25° C. 2D $^1H$-$^1H$ correlation spectroscopy (COSY), total correlated spectroscopy (TOCSY) and nuclear Overhauser effect spectroscopy (NOESY) spectra were recorded for resonance assignments. Inter-proton distance restraints were derived from 2D NOESY spectrum with mixing times of 300 ms and 500 ms using automated NOE assignment strategy followed by a manual check. NOE intensities and chemical shifts were extracted using CCPNMR Analysis 2.4.2[46] and served as inputs for the Aria program. Dihedral angle is predicted from the chemical shifts using the program DANGLE[47]. The NMR solution structure of P9R was calculated iteratively using Aria 2.3 program[48]. One hundred random conformers were annealed using distance restraints in each of the eight iteratively cycles of the combined automated NOE assignments and structure calculation algorithm. The final upper limit distance constraints output from the last iteration cycle were subjected to a thorough manual cross-checking and final water solvent structural refinement cycle. The 10 lowest energy conformers were retained from these refined 100 structures for statistical analysis. The convergence of the calculated structures was evaluated using root-mean-square deviations (RMSDs) analyses. The distributions of the backbone dihedral angles ($\varphi$, $\psi$) of the final converged structures were evaluated by representation of the Ramachandran dihedral pattern using PROCHECK-NMR[49]. Visualization of three-dimensional structures and electrostatic surface potential of P9R were achieved using UCSF Chimera 1.13.1[50].

Antiviral Analysis of P9R in Mice

BALB/c female mice, 10-12 weeks old, were kept in biosafety level 2 laboratory and given access to standard pellet feed and water ad libitum. All experimental protocols followed the standard operating procedures of the approved biosafety level 2 animal facilities and were approved by the Committee on the Use of Live Animals in Teaching and Research of the University of Hong Kong[45]. The mouse adapted H1N1 virus was used for lethal challenge of mice. To evaluate the therapeutic effect, mice were challenged with 3 $LD_{50}$ of the virus and then intranasally inoculated with PBS, P9, P9R, PA1 or zanamivir at six hours after the viral inoculation. Two more doses were given to H1N1-challenged mice at the following one day. Survival and general conditions were monitored for 16 days or until death.

Statistical Analysis

Survival of mice and the statistical significance were analyzed by GraphPad Prism 5. The statistical significance of the other results was calculated by the two-tailed Student t test using Stata statistical software. Results were considered significant at $P<0.05$.

Results

Figure 1H:
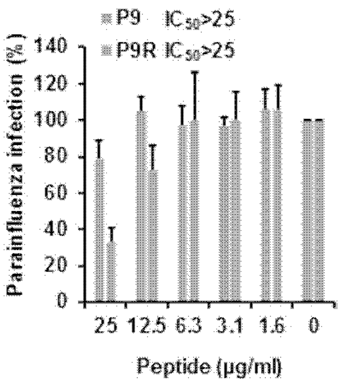
Figure 1I:
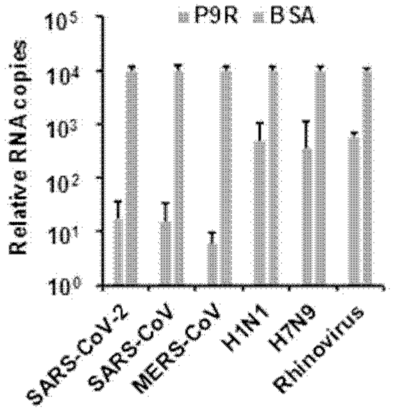
FIG. 1I show potent antiviral activities of P9R against viruses by measuring the viral RNA copies in supernatants at 24h post infection when viruses were treated by P9R or BSA (50-100 μg ml$^{-1}$).
Figure 1J:
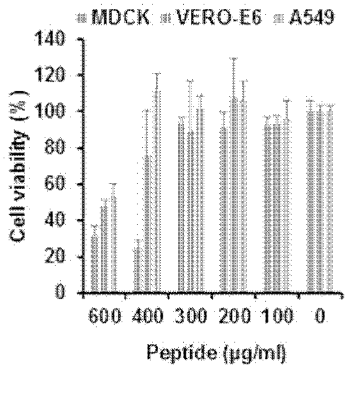
FIG. 1J shows the cytotoxicity of P9R in MDCK, Vero E6 and A549 cells. * indicates P<0.05 and ** indicates P<0.01 when $IC_{50}$ of P9R compared with that of P9. P values were calculated by the two-tailed Student's t test. Data are presented as mean±SD from at least three independent experiments.

Mouse β-Defensin-Derived Peptide P9R could Broadly Inhibit Coronaviruses and Other Respiratory Viruses Endosomal acidification is affected by the influx of protons into the endosome via the vacuolar membrane proton pump V-ATPase[27]. Theoretically, an alkaline peptide with stronger net positive charge would neutralize protons in the endosome, thereby inhibiting the endosomal acidification. Hence, to improve our previously antiviral peptide P9[13], the weakly positively charged amino acids (histidine and lysine) were substituted by arginine at positions 21 (H→R), 23 (K→R) and 28 (K→R) (FIG. 1A) to increase the net positive charge (+4.7) of P9 to charge (+5.6) of P9R. In the plaque reduction assay, the $IC_{50}$ of P9R against SARS-CoV-2 was significantly lower than that of P9 (0.9 μg $ml^{-1}$ vs 2.4 μg $ml^{-1}$, $P<0.01$) (FIG. 1B). Furthermore, P9R showed significantly stronger inhibition against MERS-CoV, A(H1N1) pdm09 virus, A(H7N9) virus, and rhinovirus than P9 (FIG. 1*c*-1*g*). However, the $IC_{50}$ of P9R and P9 against parainfluenza virus 3 was much higher (>25.0 μg $ml^{-1}$), likely because endosomal acidification was not required in the viral life cycle of parainfluenza virus 3 (FIG. 1H) 28. In the multicycle growth assay, P9R inhibited viral replication by 1000-fold for SARS-CoV-2, MERS-CoV, and SARS-CoV (FIG. 1I). For A(H1N1)pdm09 virus, A(H7N9) virus and rhinovirus, P9R could inhibit >20-fold viral replication (FIG. 1I). In addition, the $CC_{50}$ of P9R was >300 μg $ml^{-1}$ for MDCK, VeroE6 and A549 cells (FIG. 1J). These results indicated that P9R with more positive charge could more efficiently inhibit the new coronavirus SARS-CoV-2 and other enveloped and non-enveloped respiratory viruses than that of P9.

The Degree of Positive Charge is Critical for the Inhibition of Endosomal Acidification and Antiviral Activity To determine whether the net charge of the peptide affects the inhibition of endosomal acidification, the endosomal acidification assay, identified that P9R (+5.6) could more significantly inhibit endosomal acidification in live cells than that of P9 (data nor shown, and FIG. 2A), which are consistent with the stronger antiviral activity of P9R than that of P9. In addition, peptide PA1 with less positive charge (+1.7), which has the same amino acid sequence as P9 except 3 additional acidic amino acid at the C terminal, could not inhibit endosomal acidification (data not shown and FIG. 2B) and lost the antiviral activity (FIG. 2B). Hence, the degree of net positive charge was correlated with the degree of inhibition of endosomal acidification and antiviral activity.

Inhibition of Host Endosomal Acidification Alone is not Sufficient for Positively Charged Peptide Inhibiting Virus Replication To determine whether the antiviral activity solely relied on the positive charge of peptide, a peptide P9RS (+5.6) which had the same positive charge as P9R (+5.6) was designed, but P9RS differed from P9R by 11 of 30 amino acids. P9RS efficiently inhibited host endosomal acidification to the similar degree as P9R in live cells (data not shown and FIG. 2A). However, in the plaque reduction assay, there was no significant reduction of plaque numbers for SARS-CoV-2 and A(H1N1)pdm09 virus when viruses were treated by P9RS even at 25 μg $ml^{-1}$ (FIG. 2B).

To investigate why P9RS failed to inhibit viral replication despite potent inhibition of host endosomal acidification, the binding between the peptide and virus was studied. Using ELISA-RT-qPCR assay, P9R and PA1 could efficiently bind to SARS-CoV-2 and A(H1N1)pdm09 virus but P9RS did not bind to SARS-CoV-2 and A(H1N1)pdm09 virus (FIG. 2C). The observation of P9R but not P9RS binding to virus was further confirmed by confocal microscopy in H1N1-infected cells (data not shown). Thus, the direct interaction of peptide with virus was required for the antiviral activity of positively charged peptide P9R. In contrast, P9RS without the ability of binding to virus could not inhibit viral replication even though it carries the same positive charge as P9R and inhibits host endosomal acidification.

Figure 2A:
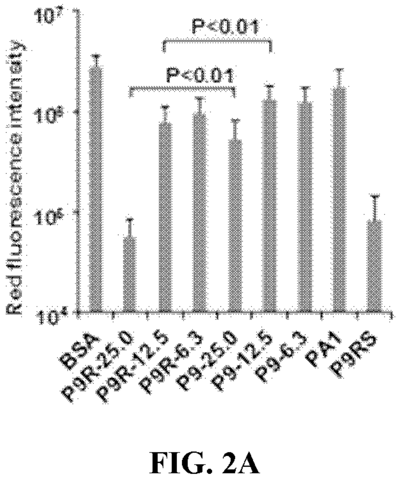
FIG. 2A shows the quantification of red fluorescence of endosomal acidification in MDCK cells treated by peptides. The red fluorescence intensity was calculated from 10 random microscope fields.
Figure 2B:
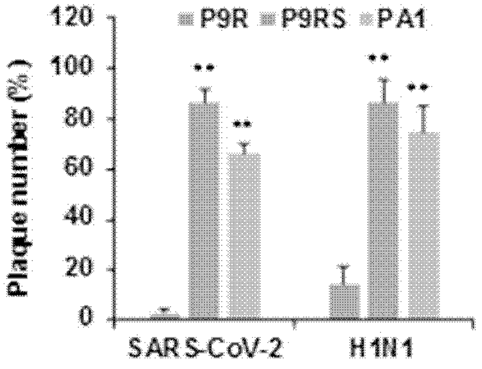
FIG. 2B shoes the antiviral activities of 25 μg ml$^{-1}$ of P9R, P9RS, and PA1 against SARS-CoV-2 and A(H1N1)pdm09 virus were measured by plaque reduction assay. Plaque number (%) of peptide-treated virus was normalized to BSA-treated virus.
Figure 2C:
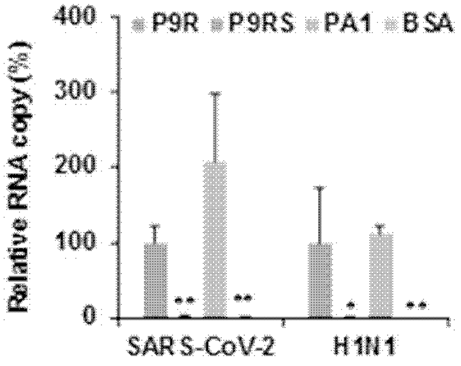
FIG. 2C shows P9R and PA1 binding to SARS-CoV-2 and A(H1N1)pdm09 virus. Viruses binding peptides were detected by ELISA and RT-qPCR. ** indicates P<0.01 when compared with P9R. P values were calculated by the two-tailed Student's t test.
Figure 3A:
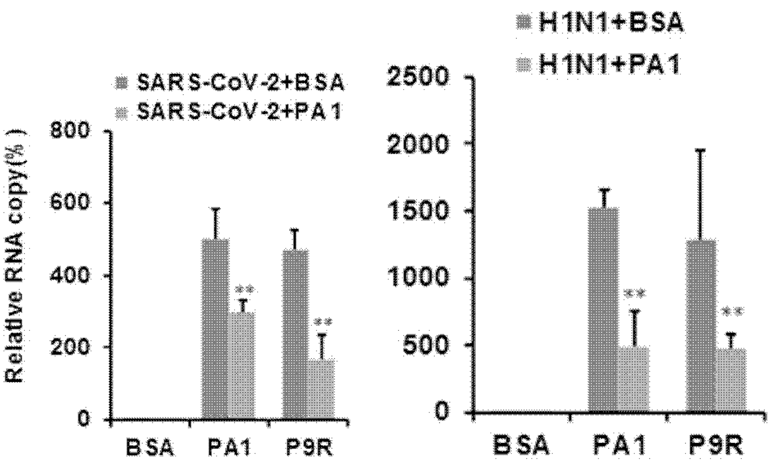
FIG. 3A shows P9R binding to SARS-CoV-2 and A(H1N1)pdm09 could be reduced by PA1. Virus was pretreated by PA1 or BSA, and then the treated virus binding to the indicated peptides were measured by RT-qPCR.  indicates P<0.01 when compared virus treated by BSA. (c) P9R could inhibit viral RNP release into nuclei. H1N1 virus was pretreated by BSA, P9R or bafilomycin A1 (BA1), and then MDCK cells were infected with the treated virus. Images of viral NP (green) and cell nuclei (blue) were taken at 3.5 h post infection.

The Broad-Spectrum Antiviral Activity of P9R Relies on Targeting Viruses to Inhibit Virus-Host Endosome Acidification The above experiments, demonstrated that P9R and P9RS can inhibit no-virus endosomal acidification (data not shown and FIG. 2A). However, without binding to virus, P9RS could not inhibit viral replication. To illustrate this result, additional studies showed that P9R and bafilomycin A1 could efficiently inhibit the virus-host endosomal acidification in infected live cells, but P9RS could not inhibit the virus-host endosomal acidification in infected live cells (FIG. 3*a*), even though both of P9R and P9RS could inhibit the endosomal acidification of no-virus endosomes (data not shown). The efficient inhibition of P9R on virus-host endosomal acidification could be due to the binding of P9R to virus (data not shown and FIG. 2C) and then inhibiting the virus-host endosomal acidification (data not shown). Lacking the binding ability to viruses (data not shown and FIG. 2E), P9RS could not efficiently enter endosomes with the viruses to inhibit the virus-host endosomal acidification, possibly because the presence of virus in endosomes prevented the entry of unbonded P9RS into the endosomes. Without viruses in endosomes, there were empty spaces in no-virus endosomes to allow P9RS freely entering endosomes to prevent endosomal acidification (data not shown). It should be noted that PA1 with a similar sequence as P9R could efficiently bind to SARS-CoV-2 and A(H1N1)pdm09 virus (FIG. 2C), but it significantly lost the antiviral activity against SARS-CoV-2 and A(H1N1)pdm09 virus (FIG. 2B). The binding of P9R to SARS-CoV-2 and A(H1N1)pdm09 virus could be significantly reduced when viruses were pretreated by PA1 (FIG. 3A). This indicated that PA1 had the same binding sites on viral particles as P9R but only peptide binding to virus alone could not account for the antiviral activity. P9R binding to virus was the first step to exert the antiviral activity. After binding to virus (data not shown), P9R could efficiently inhibit virus-host endosomal acidification (Fidata not shown) and then inhibit viral replication by blocking RNP release (data not shown).

To further confirm that broad-spectrum antiviral activity of P9R was due to the broadly bindings of P9R to different viruses and viral proteins, additional studies demonstrated that P9R but not P9RS could also bind to MERS-CoV, A(H7N9) virus, rhinovirus, SARS-CoV and viral proteins (FIG. 3B-3D and FIG. 3E). This result further confirmed that positively charged P9R could inhibit pH-dependent endosomal viruses if it can bind to viruses.

Next, studies were conducted to determine the structure of P9R using NMR spectroscopy. The results indicated that the solution structure of P9R was flexible with short variable helical patches and with positively charged peptide surface (data not shown). Without being bound by theory, P9R can broadly bind to different viruses because these short α-helical patches with flexible linkages may allow it to adapt its structure to fit the binding pockets of different viral proteins. In conclusion, the present studies demonstrate the novel antiviral mechanism that positively charged P9R needs to target viruses and then prevents virus-host endosomal acidification to inhibit pH-dependent virus replication.

The Efficacy of P9R Treatment In Vivo

Figure 4A:
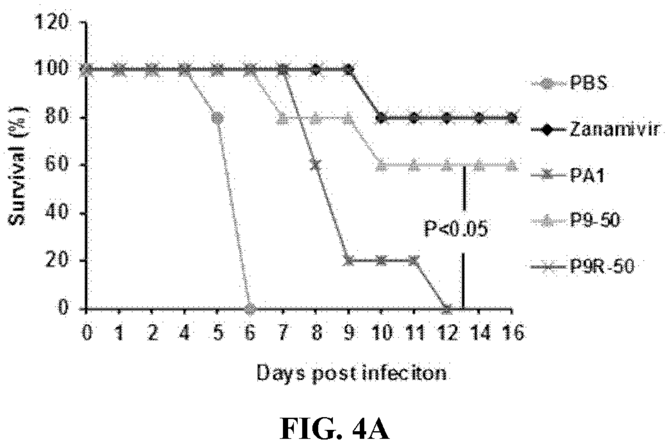
FIG. 4A shows P9R (50 μg/dose) therapeutic efficacy on mice infected by A(H1N1) virus as that of zanamivir (50 μg/dose). PBS, zanamivir, PA1, P9R, or P9 were intranasally inoculated to mice at 6 h post infection and two more doses were administrated to mice in the following one day. Five mice in each group were included.
Figure 4B:
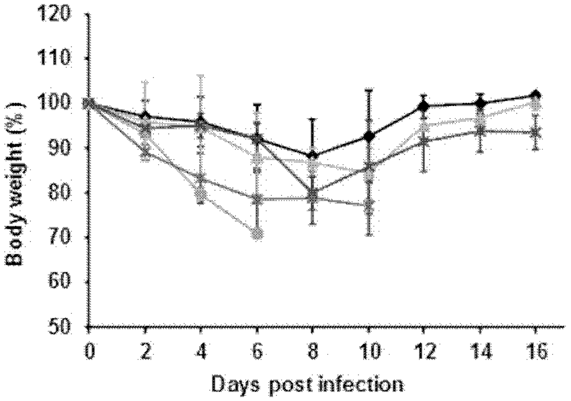
FIG. 4B shows the body weight change of infected mice corresponding to (FIG. 4A).

Studies demonstrated that the efficient antiviral activity of P9R in vitro is reliant on binding to viruses and the positive charge of P9R to inhibit virus-host endosomal acidification. To further investigate the antiviral activity of P9R in vivo, A(H1N1)pdm09-infected mice were treated at 6 h post infection with additional two doses in the following one day. In this model, 80% of P9R-treated mice survived, which was significantly better than PBS-treated group and PA1-treated group (FIG. 4A). The protection of P9R on infected mice was the same as that in the zanamivir-treated group (80%) and was better than P9. From day 4 to day 10 post infection, there was significantly less body weight loss in P9R group than that in PBS-treated group and PA1-treated group (FIG. 4B). The low dose protection of P9R (25 μg/dose and 12.5 μg/dose) on infected mice and reducing body weight loss further demonstrated that P9R could significantly protect mice when compared with PBS-treated group (FIGS. 4C and 4D). The antiviral activity of P9R in vivo was better than that of P9 (FIG. 4C, $P<0.05$ for 12.5 μg/dose), which was consistent with the significantly better antiviral activity of P9R than P9 in vitro.

Figure 5B:
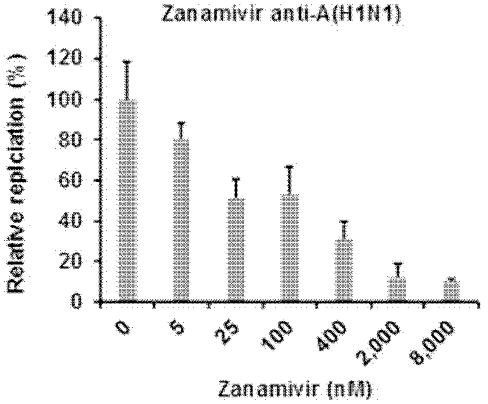
FIG. 5B shows Zanamivir inhibition of parent A(H1N1) virus (P0). The $IC_{50}$ of zanamivir against parent H1N1 was 35 nM.
Figure 5C:
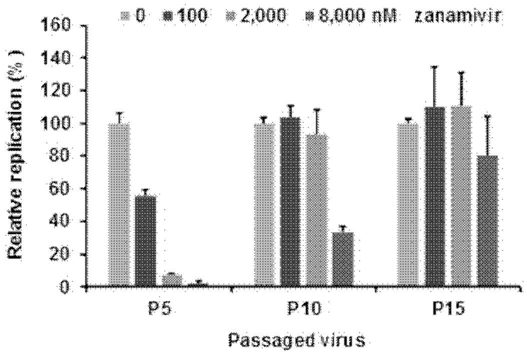
FIG. 5C shows the antiviral efficiency of zanamivir against passaged A(H1N1) virus in the presence of zanamivir.
Figure 5D:
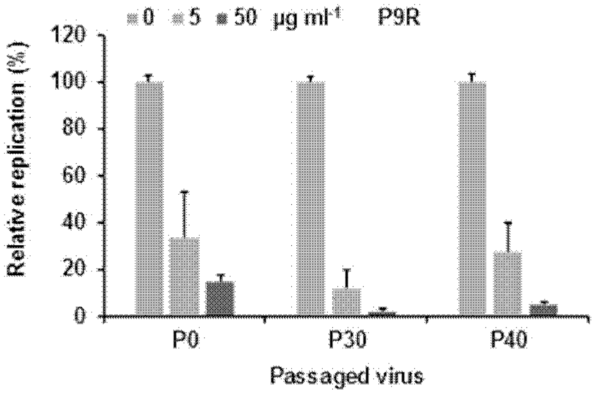
FIG. 5D shows the antiviral efficiency of P9R against passaged A(H1N1) virus in the presence of P9R. Passaged viruses were premixed with zanamivir (nM) or P9R (μg $ml^{-1}$) for infection. Supernatants were collected at 24 h post infection. Viral titers in the supernatants were determined by RT-qPCR. The relative replication (%) was normalized to the corresponding passaged viruses without treatment. Data are presented as mean±SD of three independent experiments.

No Emergence of Resistant Viruses Against P9R after Serial Passages of Virus in the Presence of P9R Emergence of resistant mutants occur from time to time[14], especially with the new polymerase inhibitor baloxavir[29]. To determine whether P9R treatment induces viral resistance, A(H1N1)pdm09 virus was serially passaged 40 times in the presence of P9R in MDCK cells (FIG. 5A). A(H1N1)pdm09 virus was serially passaged in the presence of zanamivir as a control for resistance assay (FIG. 5A). The $IC_{50}$ of zanamivir against parent A(H1N1)pdm09 virus (P0) was 35 nM (FIG. 5B). After 10-virus passages in the presence of zanamivir (100 nM) and additional 5-virus passages in the presence of zanamivir (1000 nM), 2000 nM and 8000 nM zanamivir could not inhibit P10 and P15 virus replication, respectively (FIG. 5C). These indicated that after 10 passages of virus in the presence of zanamivir had caused significant viral resistance to zanamivir. However, for P9R, even the A(H1N1)pdm09 virus was passaged in the presence (5.0 μg $ml^{-1}$ of P9R for the initial 10 passages and 50.0 μg $ml^{-1}$ for the rest 30 passages) of P9R for 40 passages, P9R (5.0 μg $ml^{-1}$) could efficiently inhibit P30 and P40 virus replication (FIG. 5D). No obvious drug-resistant virus to P9R was detected. These results indicated that P9R had very low possibility to cause drug-resistant virus.

DISCUSSION

In this study, a broad-spectrum antiviral peptide P9R with potent antiviral activity against enveloped coronaviruses (SARS-CoV-2, SARS-CoV and MERS-CoV), influenza virus, and non-enveloped rhinovirus was identified. First, studies demonstrated that the antiviral activity of P9R could be significantly enhanced by increasing the net positive charge to more efficiently inhibit endosomal acidification. Second, mechanistic studies further demonstrated the novel antiviral mechanism that positively charged P9R could bind to different respiratory viruses to inhibit virus-host endosomal acidification. PA1 (only binding to viruses) or P9RS (only inhibiting endosomal acidification) did not show antiviral activity. Mechanistic studies showed that positively charged P9R broadly inhibits viral replication by binding to different viruses and then inhibiting virus-host endosomal acidification to prevent the endosomal release of pH-dependent viruses. P9R (not only binding to viruses but also inhibiting endosomal acidification), PA1 (only binding to viruses) and P9RS (only inhibiting endosomal acidification) were used to identify and confirm the novel antiviral mechanism of alkaline peptides. Third, the in vivo antiviral activity of P9R was demonstrated by protecting mice from lethal influenza virus challenge. The antiviral activity of alkaline peptide could be enhanced by increasing the positive charge of peptide and required both of binding to viruses and inhibiting endosomal acidification. Fourth, there was no reduced susceptibility of serial-passaged viruses (40 passages) against P9R.

Endosomal acidification is a key step in the life cycle of many pH-dependent viruses, which is one of the broad-spectrum antiviral targets[9]. In this study, with the increased positive charge in P9R, it could more efficiently inhibit pH-dependent viruses than P9. The more positive charge in P9R allowed the peptide to more efficiently neutralize protons inside endosomes, and thereby inhibiting the endosomal acidification. In previous studies, the clinically approved anti-malarial drug chloroquine with activity of inhibiting endosomal acidification had been demonstrated to inhibit enterovirus-A7[30], zika virus[31] and SARS-CoV-2[32]. The anti-parasitic drug niclosamide also inhibited influenza virus, rhinovirus, and dengue virus by interfering endosomal acidification[33, 34]. However, researchers demonstrated the lack of protection of chloroquine in vivo for treating influencza virus and Ebola virus[35, 36]. Differing from these drugs by interfering host endosomal acidification without targeting viruses, P9R inhibits viral replication by binding to viruses and then inhibiting virus-host endosomal acidification, which allows P9R to selectively and efficiently inhibit endosomal viruses. The protection of P9R on A(H1N1)-infected mice further confirmed the antiviral efficiency in vivo.

Figure 3B:
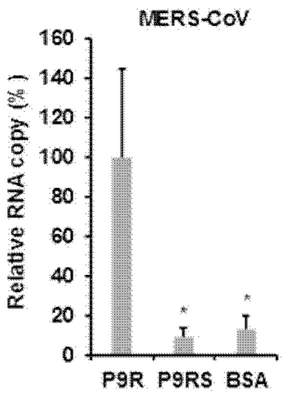
FIGS. 3B-3**D include data showing P9R could broadly bind to MERS-CoV, H7N9 virus, and rhinovirus. The relative RNA copy of virus binding to peptides was normalized to the virus binding to P9R. * indicates P<0.05.  indicates the P<0.01 when compared with P9R. P values were calculated by the two-tailed Student's t test.
Figure 3C:
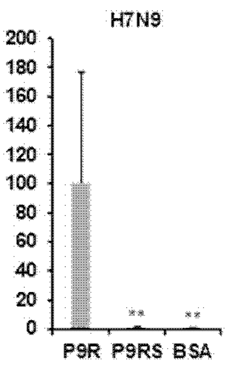
Figure 3D:
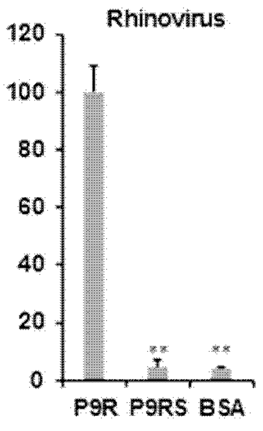
Figure 3E:
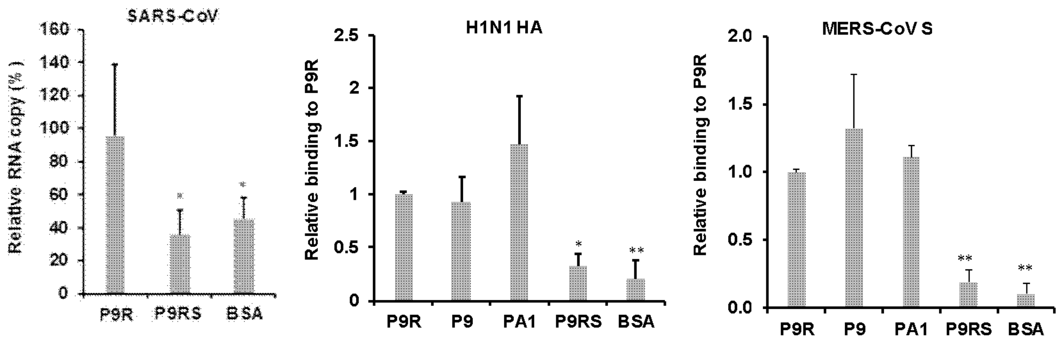

The antiviral activity of P9R required both of binding to viruses and inhibiting endosomal acidification. PA1 with less positive charge could not inhibit SARS-CoV-2 and H1N1 virus even though it had the similar binding ability and binding sites to viruses as P9R (FIG. 3*b*). When multiple substitutions were made on P9R to generate P9RS, P9RS lost the binding ability and antiviral activity to all tested viruses even though P9RS had the same positive charge as P9R and efficiently inhibited host endosomal acidification. While not being bound by theory, the broadly binding mechanism of P9R to different viral proteins may be due to the flexible structure of P9R with positively charged surface (FIG. 3*h*). The flexible structure may allow P9R to change its structure to fit targeting proteins for broad-specificity bindings[37, 38], and the positive charge of P9R may play roles for binding to viruses with negatively charged surface[39, 40]. The five cysteines in P9R may also affect the structure-based binding because previous studies indicated that cysteine substitutions could affect defensin-peptide structure and activity[41, 42].

In addition, comparing with zanamivir which caused significant drug resistant virus after 10-virus passages in the presence of zanamivir, P9R showed very low risk to cause drug-resistance virus even when A(H1N1)pdm09 virus was passaged in the presence of P9R for 40 passages.

In summary, most highly pathogenic emerging viruses are endosomal pH-dependent viruses. The emerging and re-emerging virus outbreaks remind us of the urgent need of broad-spectrum antivirals. The present studies provide one such broad-spectrum antiviral.

The disclosed compositions, and methods can be further understood through the following numbered paragraphs.

1. An antiviral agent comprising P9R (SEQ ID NO:2), or a P9R-like peptides derived from P9R.

2. The antiviral agent of paragraph 1, wherein the P9R-like peptide is characterized in that the P9R-like peptide inhibits endosomal acidification and retains virus binding as determined by an in vitro endosomal acidification, optionally compared to a control, and a peptide-virus binding assays.

3. The antiviral agent of paragraph 1 or 2, consisting of P9R (SEQ ID NO:2).

4. The antiviral agent of any one of paragraphs 1-3, wherein the antiviral agent has a net positive charge of at least 5.

5. The antiviral agent of any one of paragraphs 1-4, wherein the antiviral agent has a net positive charge of about 5.6.

6. The antiviral agent of any one of paragraphs 1-5, wherein the antiviral agent has a net positive charge of 5.6.

7. A composition comprising a therapeutically effective amount of the antiviral agent of any one of paragraphs 1-6 and a pharmaceutically acceptable carrier.

8. The composition of paragraph 7, wherein the antiviral agent inhibits antiviral replication in the subject.

9. The composition of paragraph 7 or 8, wherein the composition is a unit dosage form.

10. The composition of claim 9, wherein the unit dosage form is selected from the group consisting of a table or capsule.

11. The composition of paragraph 7, in a form suitable for intranasal or pulmonary delivery.

12. The composition of paragraph 9, wherein the unit dosage form is an injectable, wherein the composition further comprises a pharmaceutically acceptable carrier for injection to a human.

13. A method of treating a viral infection in a subject in need thereof, the method comprising administering an effective amount of the antiviral agent of any one of paragraphs 1-6 or the composition of any one of paragraphs 7-12, to the subject.

14. The method of paragraph 13, wherein the infection is caused by a respiratory virus.

15. The method of paragraphs 13 or 14, wherein the infection is caused by a pH-dependent virus that requires endosomal acidification for virus-host membrane fusion.

16. The method of any one of paragraphs 13-15, wherein the composition is administered parenterally or orally.

17. The method of any one of paragraphs 13-15, wherein the composition is administered intranasally, or by pulmonary administration.

18. The method of claim of any one of paragraphs 13-17, wherein the infection is caused by zika virus, enterovirus-A7, ebola virus, influenza virus, SARS-CoV-2, SARS-CoV, MERS-CoV, the A(H1N1)pdm09 virus, avian influenza A(H7N9) virus, and the non-enveloped rhinovirus.

Those skilled in the art will recognize, or be able to ascertain using no more than routine experimentation, many equivalents to the specific embodiments of the invention described herein. Such equivalents are intended to be encompassed by the following claims.

It is understood that the disclosed method and compositions are not limited to the particular methodology, protocols, and reagents described as these may vary. It is also to be understood that the terminology used herein is for the purpose of describing particular embodiments only, and is not intended to limit the scope of the present invention which will be limited only by the appended claims.

It must be noted that as used herein and in the appended claims, the singular forms “a”, “an”, and “the” include plural reference unless the context clearly dictates otherwise.

Throughout the description and claims of this specification, the word “comprise” and variations of the word, such as “comprising” and “comprises,” means “including but not limited to," and is not intended to exclude, for example, other additives, components, integers or steps.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. It should be understood that all of the individual values and sub-ranges of values contained within an explicitly disclosed range are also specifically contemplated and should be considered disclosed unless the context specifically indicates otherwise. Finally, it should be understood that all ranges refer both to the recited range as a range and as a collection of individual numbers from and including the first endpoint to and including the second endpoint. In the latter case, it should be understood that any of the individual numbers can be selected as one form of the quantity, value, or feature to which the range refers. In this way, a range describes a set of numbers or values from and including the first endpoint to and including the second endpoint from which a single member of the set (i.e. a single number) can be selected as the quantity, value, or feature to which the range refers. The foregoing applies regardless of whether in particular cases some or all of these embodiments are explicitly disclosed.

Unless defined otherwise, all technical and scientific terms used herein have the same meanings as commonly understood by one of skill in the art to which the disclosed method and compositions belong. Although any methods and materials similar or equivalent to those described herein can be used in the practice or testing of the present method and compositions, the particularly useful methods, devices, and materials are as described. Publications cited herein and the material for which they are cited are hereby specifically incorporated by reference.

Nothing herein is to be construed as an admission that the present invention is not entitled to antedate such disclosure by virtue of prior invention. No admission is made that any reference constitutes prior art. The discussion of references states what their authors assert, and applicants reserve the right to challenge the accuracy and pertinency of the cited documents. It will be clearly understood that, although a number of publications are referred to herein, such reference does not constitute an admission that any of these documents forms part of the common general knowledge in the art.

Although the description of materials, compositions, components, steps, techniques, etc. may include numerous options and alternatives, this should not be construed as, and is not an admission that, such options and alternatives are equivalent to each other or, in particular, are obvious alternatives. Thus, for example, a list of different moieties does not indicate that the listed moieties are obvious one to the other, nor is it an admission of equivalence or obviousness.

REFERENCE

1. Woo, P. C. et al. Relative rates of non-pneumonic SARS coronavirus infection and SARS coronavirus pneumonia. *Lancet* 363, 841-845 (2004).
2. Lau, S. K. et al. Severe acute respiratory syndrome coronavirus-like virus in Chinese horseshoe bats. *Proc Natl Acad Sci USA* 102, 14040-14045 (2005).
3. Chan, J. F. et al. Middle East respiratory syndrome coronavirus: another zoonotic betacoronavirus causing SARS-like disease. *Clinical microbiology reviews* 28, 465-522 (2015).
4. Yeung, M. L. et al. MERS coronavirus induces apoptosis in kidney and lung by upregulating Smad7 and FGF2. *Nat Microbiol* 1, 16004 (2016).
5. Chan, J. F. et al. A familial cluster of pneumonia associated with the 2019 novel coronavirus indicating person-to-person transmission: a study of a family cluster. *Lancet* 395, 514-523 (2020).
6. To, K. K., Chan, J. F., Chen, H., Li, L. & Yuen, K. Y. The emergence of influenza A H7N9 in human beings 16 years after influenza A H5N1: a tale of two cities. *Lancet Infect Dis* 13, 809-821 (2013).
7. Cheng, V. C., To, K. K., Tse, H., Hung, I. F. & Yuen, K. Y. Two years after pandemic influenza A/2009/H1N1: what have we learned? *Clinical microbiology reviews* 25, 223-263 (2012).
8. Li, Q. et al. Early Transmission Dynamics in Wuhan, China, of Novel Coronavirus-Infected Pneumonia. *N Engl J Med* (2020).
9. Vigant, F., Santos, N. C. & Lee, B. Broad-spectrum antivirals against viral fusion. *Nat Rev Microbiol* 13, 426-437 (2015).
10. Yuan, S. et al. SREBP-dependent lipidomic reprogramming as a broad-spectrum antiviral target. *Nat Commun* 10, 120 (2019).
11. Rajendran, L., Knölker, H. J. & Simons, K. Subcellular targeting strategies for drug design and delivery. *Nat Rev Drug Discov* 9, 29-42 (2010).
12. Yan, N. & Chen, Z. J. Intrinsic antiviral immunity. *Nat Immunol* 13, 214-222 (2012).
13. Zhao, H. et al. A novel peptide with potent and broad-spectrum antiviral activities against multiple respiratory viruses. *Sci Rep* 6, 22008 (2016).
14. Zhao, H. et al. Dual-functional peptide with defective interfering genes effectively protects mice against avian and seasonal influenza. *Nat Commun* 9, 2358 (2018).
15. Yu, Y. et al. A peptide-based viral inactivator inhibits Zika virus infection in pregnant mice and fetuses. *Nat Commun* 8, 15672 (2017).
16. Lu, L. et al. Structure-based discovery of Middle East respiratory syndrome coronavirus fusion inhibitor. *Nat Commun* 5, 3067 (2014).
17. Swanson, M. D. et al. Engineering a therapeutic lectin by uncoupling mitogenicity from antiviral activity. *Cell* 163, 746-758 (2015).
18. Leikina, E. et al. Carbohydrate-binding molecules inhibit viral fusion and entry by crosslinking membrane glycoproteins. *Nat Immunol* 6, 995-1001 (2005).
19. Sample, C. J. et al. A mastoparan-derived peptide has broad-spectrum antiviral activity against enveloped viruses. *Peptides* 48, 96-105 (2013).

20. Li, Q. et al. Virucidal activity of a scorpion venom peptide variant mucroporin-M1 against measles, SARS-CoV and influenza H5N1 viruses. *Peptides* 32, 1518-1525 (2011).
21. Li, F. et al. A scorpion venom peptide Ev37 restricts viral late entry by alkalizing acidic organelles. *J Biol Chem* 294, 182-194 (2019).
22. Smith, J. G. & Nemerow, G. R. Mechanism of adenovirus neutralization by Human alpha-defensins. *Cell Host Microbe* 3, 11-19 (2008).
23. Brice, D. C. & Diamond, G. Antiviral Activities of Human Host Defense Peptides. *Curr Med Chem* (2019).
24. Klotman, M. E. & Chang, T. L. Defensins in innate antiviral immunity. *Nat Rev Immunol* 6, 447-456 (2006).
25. Liu, S. et al. Different from the HIV fusion inhibitor C34, the anti-HIV drug Fuzeon (T-20) inhibits HIV-1 entry by targeting multiple sites in gp41 and gp120. *J Biol Chem* 280, 11259-11273 (2005).
26. Gomes, B. et al. Designing improved active peptides for therapeutic approaches against infectious diseases. *Biotechnol Adv* 36, 415-429 (2018).
27. Huotari, J. & Helenius, A. Endosome maturation. *EMBO J* 30, 3481-3500 (2011).
28. Moscona, A. Entry of parainfluenza virus into cells as a target for interrupting childhood respiratory disease. *J Clin Invest* 115, 1688-1698 (2005).
29. Hayden, F. G. et al. Baloxavir Marboxil for Uncomplicated Influenza in Adults and Adolescents. *N Engl J Med* 379, 913-923 (2018).
30. Tan, Y. W., Yam, W. K., Sun, J. & Chu, J. J. H. An evaluation of Chloroquine as a broad-acting antiviral against Hand, Foot and Mouth Disease. *Antiviral Res* 149, 143-149 (2018).
31. Li, C. et al. Chloroquine, a FDA-approved Drug, Prevents Zika Virus Infection and its Associated Congenital Microcephaly in Mice. *EBioMedicine* 24, 189-194 (2017).
32. Wang, M. et al. Remdesivir and chloroquine effectively inhibit the recently emerged novel coronavirus (2019-nCOV) in vitro. *Cell Res* (2020).
33. Jurgeit, A. et al. Niclosamide is a proton carrier and targets acidic endosomes with broad antiviral effects. *PLoS Pathog* 8, e1002976 (2012).
34. Kao, J. C. et al. The antiparasitic drug niclosamide inhibits dengue virus infection by interfering with endosomal acidification independent of mTOR. *PLoS Negl Trop Dis* 12, e0006715 (2018).
35. Falzarano, D. et al. Lack of protection against ebola virus from chloroquine in mice and hamsters. *Emerg Infect Dis* 21, 1065-1067 (2015).
36. Paton, N. I. et al. Chloroquine for influenza prevention: a randomised, double-blind, placebo controlled trial. *Lancet Infect Dis* 11, 677-683 (2011).
37. Seppala, J. et al. Flexible Structure of Peptide-Bound Filamin A Mechanosensor Domain Pair 20-21. *PLoS One* 10, e0136969 (2015).
38. Nakano, S. et al. Structural and computational analysis of peptide recognition mechanism of class-C type penicillin binding protein, alkaline D-peptidase from *Bacillus cereus* DF4-B. *Sci Rep* 5, 13836 (2015).
39. Hammen, P. K., Waltner, M., Hahnemann, B., Heard, T. S. & Weiner, H. The role of positive charges and structural segments in the presequence of rat liver aldehyde dehydrogenase in import into mitochondria. *J Biol Chem* 271, 21041-21048 (1996).
40. Michen, B. & Graule, T. Isoelectric points of viruses. *J Appl Microbiol* 109, 388-397 (2010).
41. Chandrababu, K. B., Ho, B. & Yang, D. Structure, dynamics, and activity of an all-cysteine mutated human beta defensin-3 peptide analogue. *Biochemistry* 48, 6052-6061 (2009).
42. Liu, S. et al. Linear analogues of human beta-defensin 3: concepts for design of antimicrobial peptides with reduced cytotoxicity to mammalian cells. *Chembiochem* 9, 964-973 (2008).
43. To, K. K. et al. Consistent detection of 2019 novel coronavirus in saliva. *Clin Infect Dis* (2020).
44. To, K. K. et al. Pulmonary and extrapulmonary complications of human rhinovirus infection in critically ill patients. *J Clin Virol* 77, 85-91 (2016).
45. Zheng, B. J. et al. Delayed antiviral plus immunomodulator treatment still reduces mortality in mice infected by high inoculum of influenza A/H5N1 virus. *Proc Natl Acad Sci USA* 105, 8091-8096 (2008).
46. Skinner, S. P. et al. CcpNmr AnalysisAssign: a flexible platform for integrated NMR analysis. *J Biomol NMR* 66, 111-124 (2016).
47. Cheung, M. S., Maguire, M. L., Stevens, T. J. & Broadhurst, R. W. DANGLE: A Bayesian inferential method for predicting protein backbone dihedral angles and secondary structure. *J Magn Reson* 202, 223-233 (2010).
48. Rieping, W. et al. ARIA2: automated NOE assignment and data integration in NMR structure calculation. *Bioinformatics* 23, 381-382 (2007).
49. Laskowski, R. A., Rullmannn, J. A., MacArthur, M. W., Kaptein, R. & Thornton, J. M. AQUA and PROCHECK-NMR: programs for checking the quality of protein structures solved by NMR. *J Biomol NMR* 8, 477-486 (1996).
50. Pettersen, E. F. et al. UCSF Chimera—a visualization system for exploratory research and analysis. *J Comput Chem* 25, 1605-1612 (2004).

We claim:

1. An antiviral agent comprising

[i] a P9R peptide comprising the amino acid sequence as set forth in SEQ ID NO: 2, or

[ii] a P9R-like peptide comprising the amino acid sequence as set forth in SEQ ID NO: 4.

2. The antiviral agent of claim 1, wherein the P9R peptide or the P9R-like peptide inhibits endosomal acidification and retains virus binding.

3. The antiviral agent of claim 1, wherein

[a] the P9R peptide consists of the amino acid sequence as set forth in SEQ ID NO: 2, or

[b] the P9R-like peptide consists of the amino acid sequence as set forth in SEQ ID NO: 4.

4. The antiviral agent of claim 1, wherein the antiviral agent has a net positive charge of at least 5.

5. The antiviral agent of claim 1, wherein the antiviral agent has a net positive charge of about 5.6.

6. A composition comprising a therapeutically effective amount of the antiviral agent of claim 1 and a pharmaceutically acceptable carrier.

7. The composition of claim 6, wherein the antiviral agent inhibits antiviral replication in a subject.

8. The composition of claim 6, wherein the composition is a unit dosage form.

9. The composition of claim 8, wherein the unit dosage form is selected from the group consisting of a tablet or a capsule.

10. The composition of claim 6, wherein the composition is in a form suitable for intranasal or pulmonary delivery.

11. The composition of claim 8, wherein the unit dosage form is an injectable, wherein the composition further comprises a second pharmaceutically acceptable carrier for injection into a human.

12. A method of treating a viral infection in a subject in need thereof, the method comprising administering an effective amount of the antiviral agent of claim 1 or the composition of claim 6 to the subject in need thereof.

13. The method of claim 12, wherein the virus infection is caused by a respiratory virus.

14. The method of claim 12, wherein the virus infection is caused by a pH-dependent virus that requires endosomal acidification for virus-host membrane fusion.

15. The method of claim 12, wherein the composition is administered parenterally or orally.

16. The method of claim 12, wherein the composition is administered intranasally, or by pulmonary administration.

17. The method of claim 12, wherein the virus infection is caused by zika virus, enterovirus-A7, ebola virus, influenza virus, SARS-CoV-2, SARS-CoV, MERS-CoV, the A(H1N1)pdm09 virus, avian influenza A(H7N9) virus, or a non-enveloped rhinovirus.

* * * * *